INVENTORS:
Gilbert R. Wolter
Alfred F. Ernstberger
Frederick J. Ritter
By George R. Clark Atty Nov. 17, 1970  G. R. WOLTER ET AL  3,540,072
FLOOR CONDITIONER
Filed Aug. 3, 1964  13 Sheets-Sheet 3
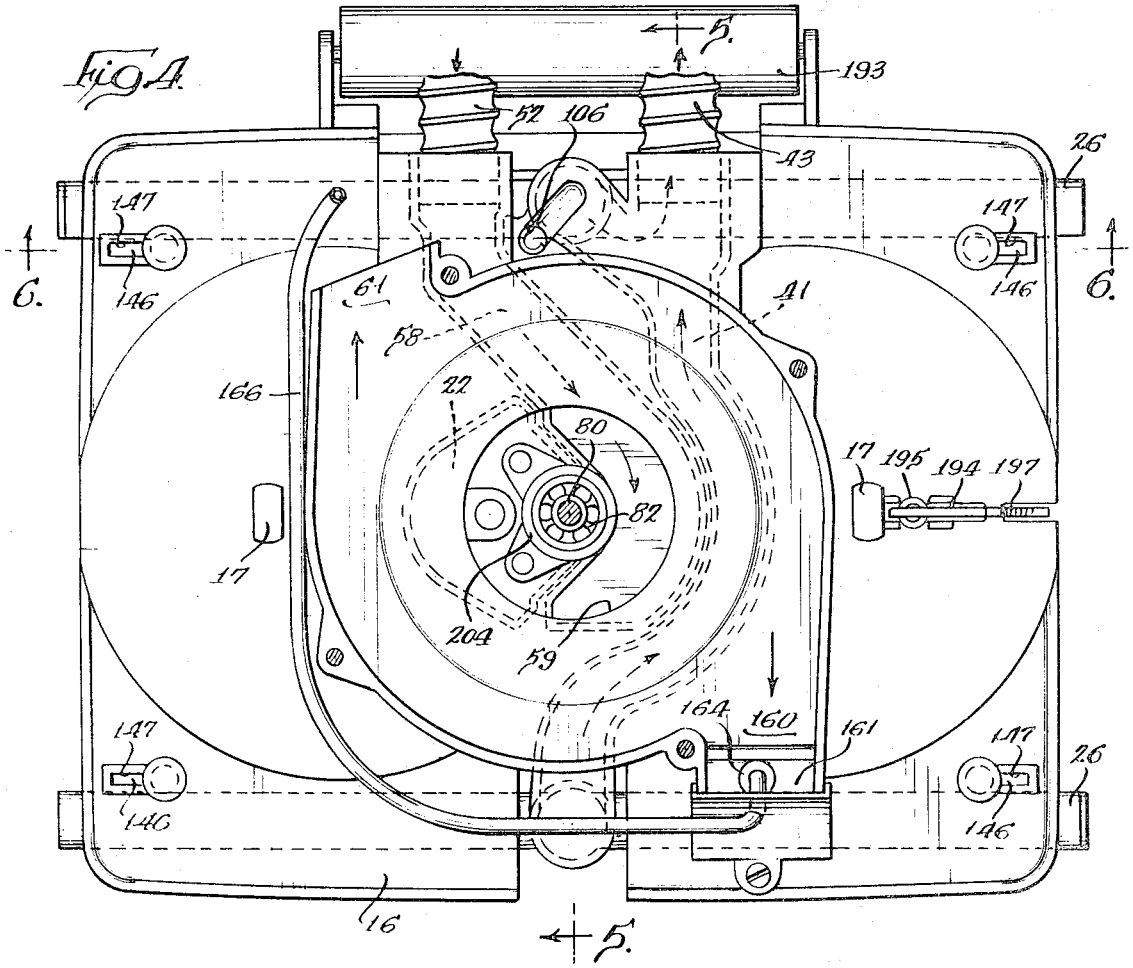
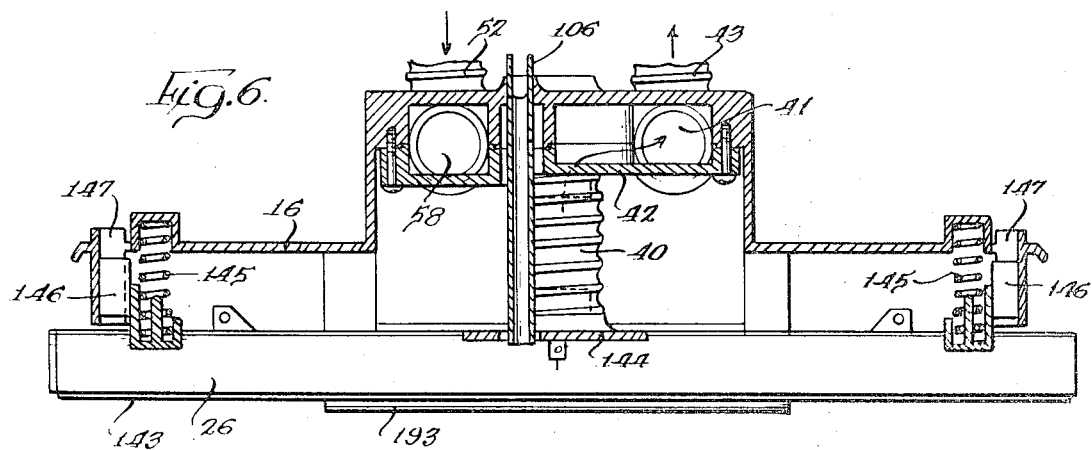
INVENTORS:
Gilbert R. Wolter
Alfred F. Ernstberger
Frederick J. Ritter
By
George R. Clark  Atty

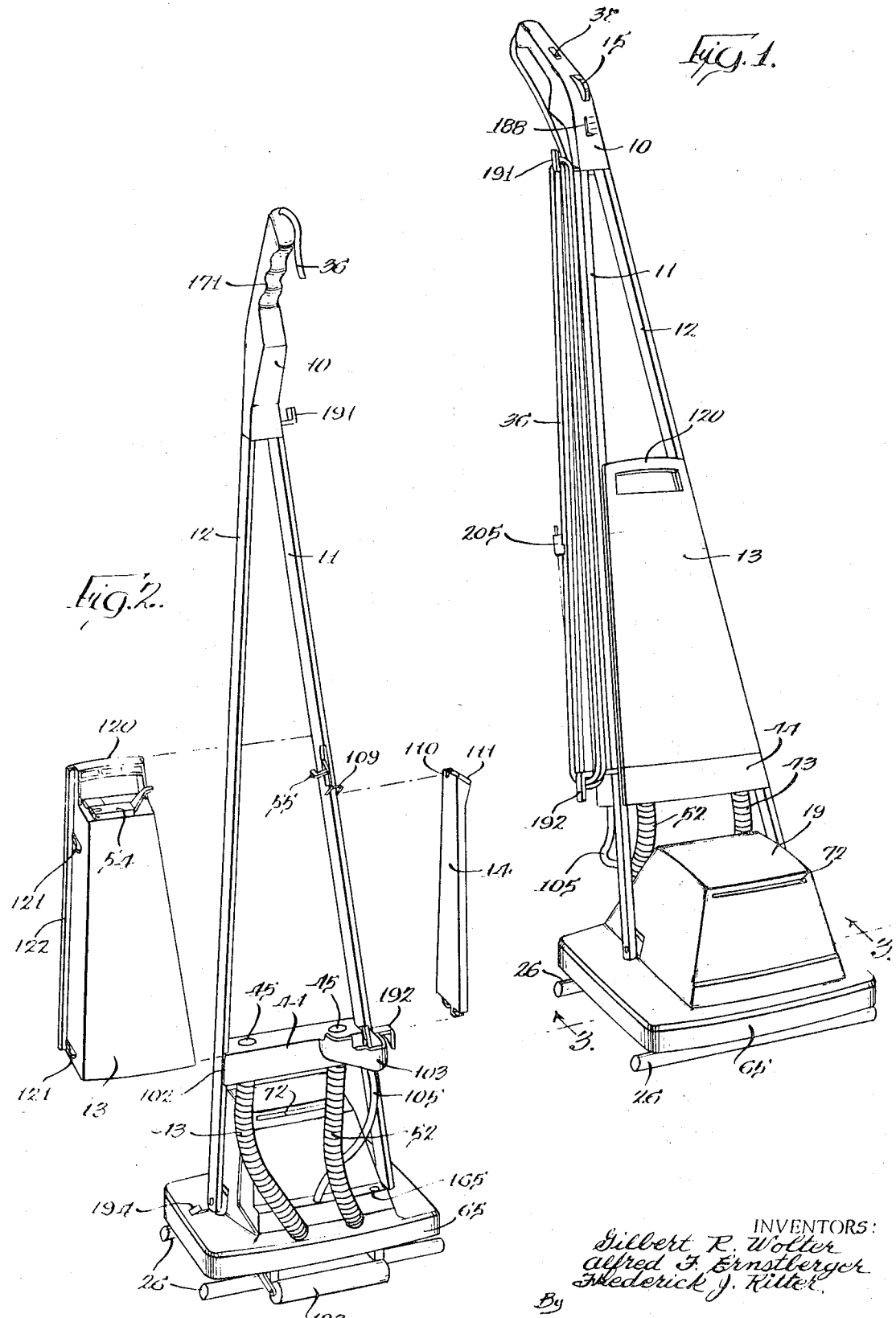

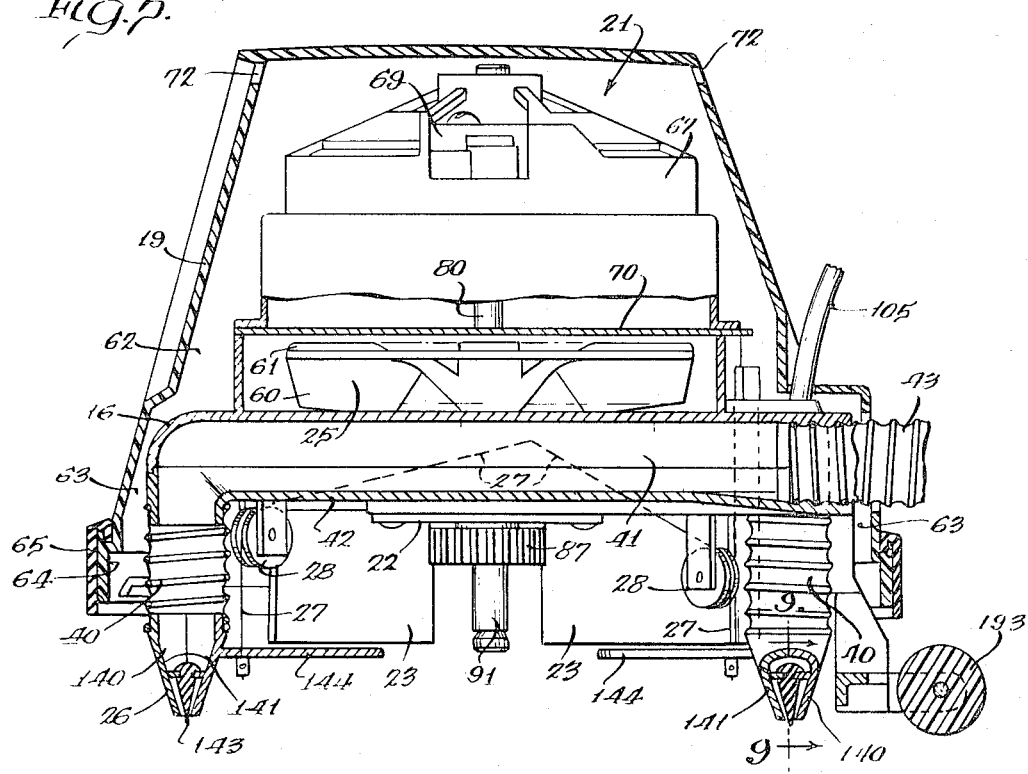
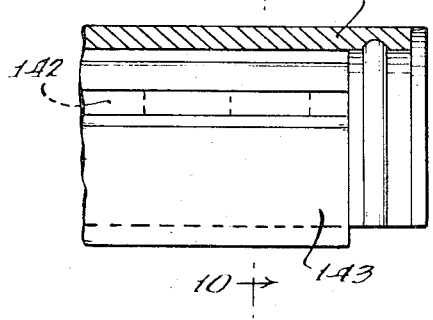
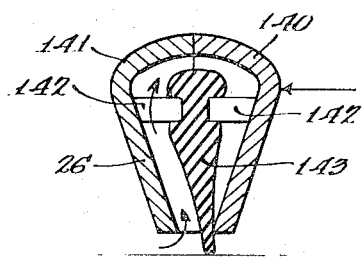

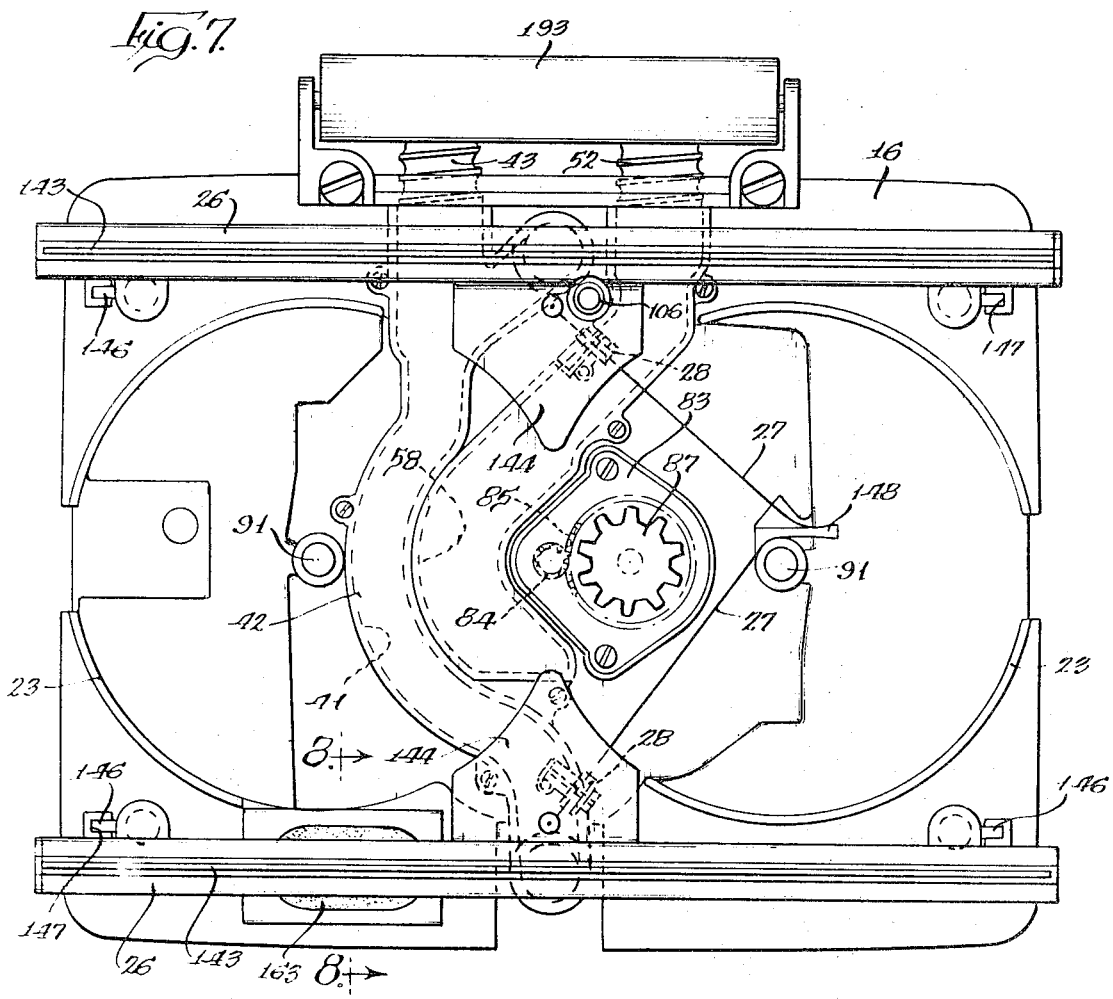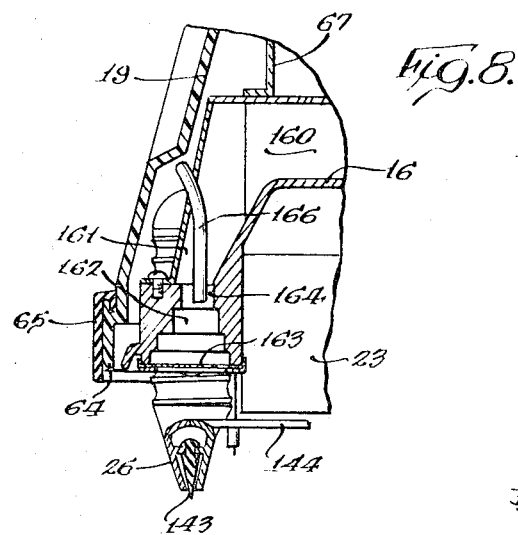

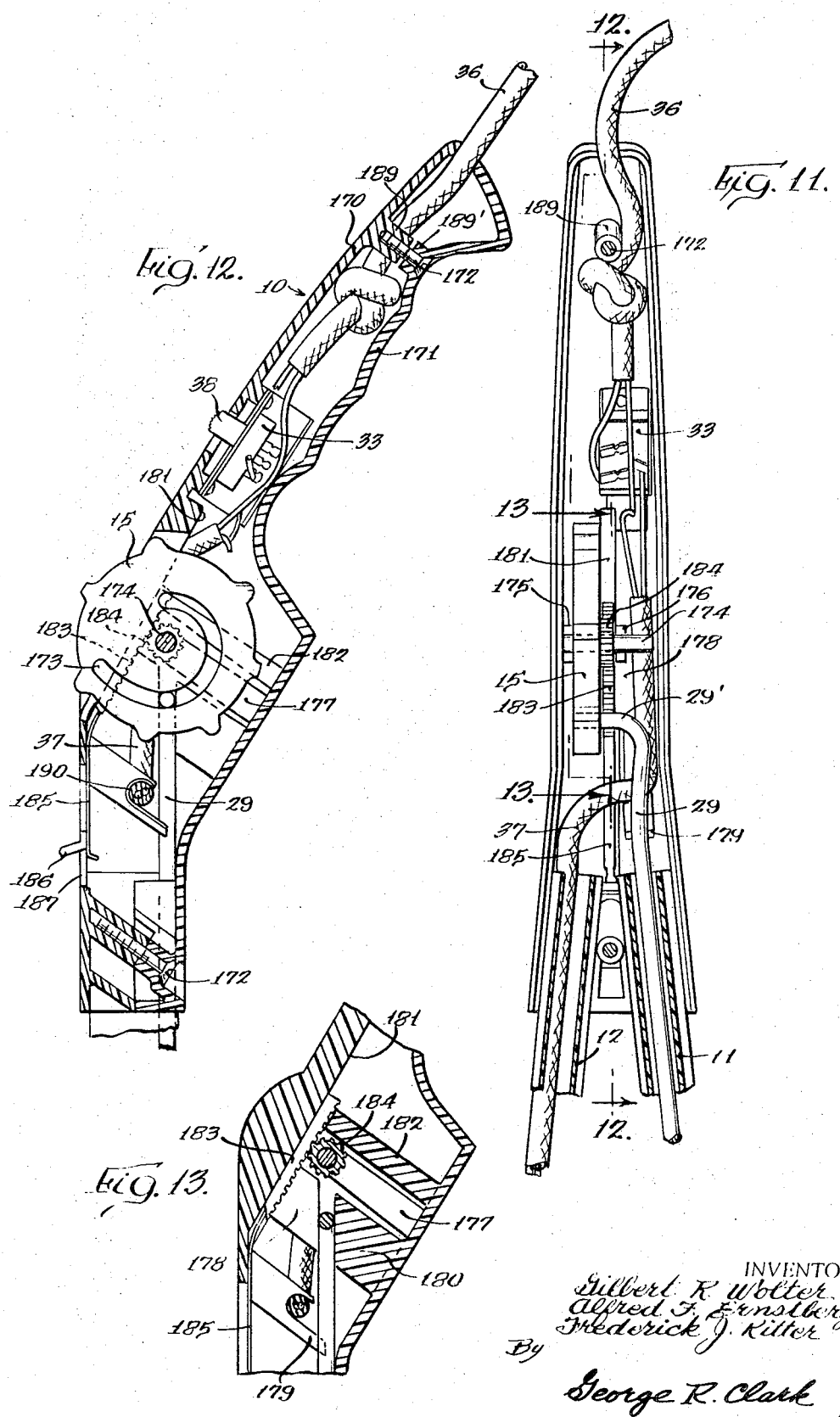

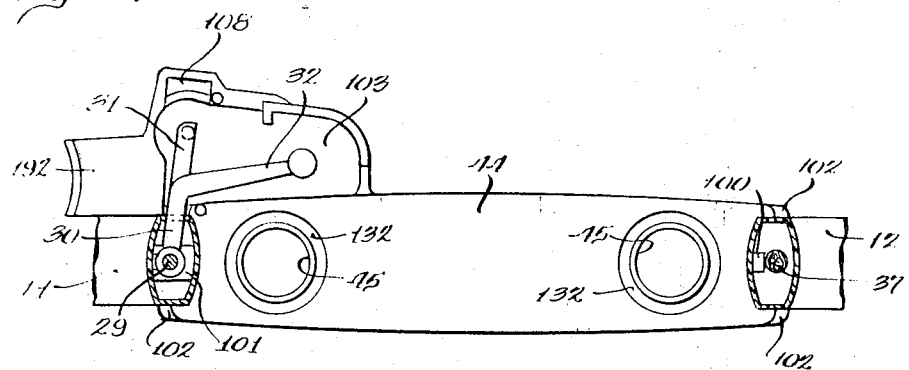
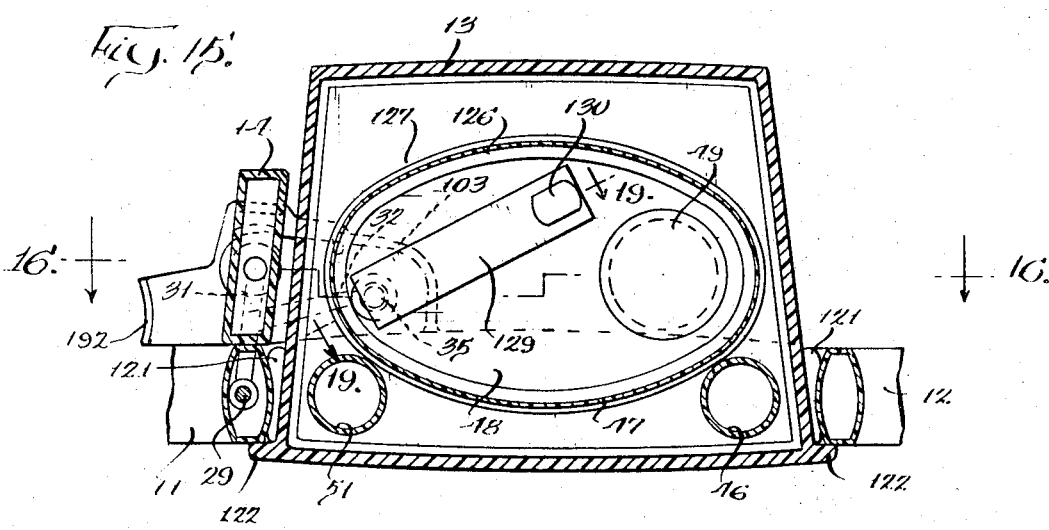

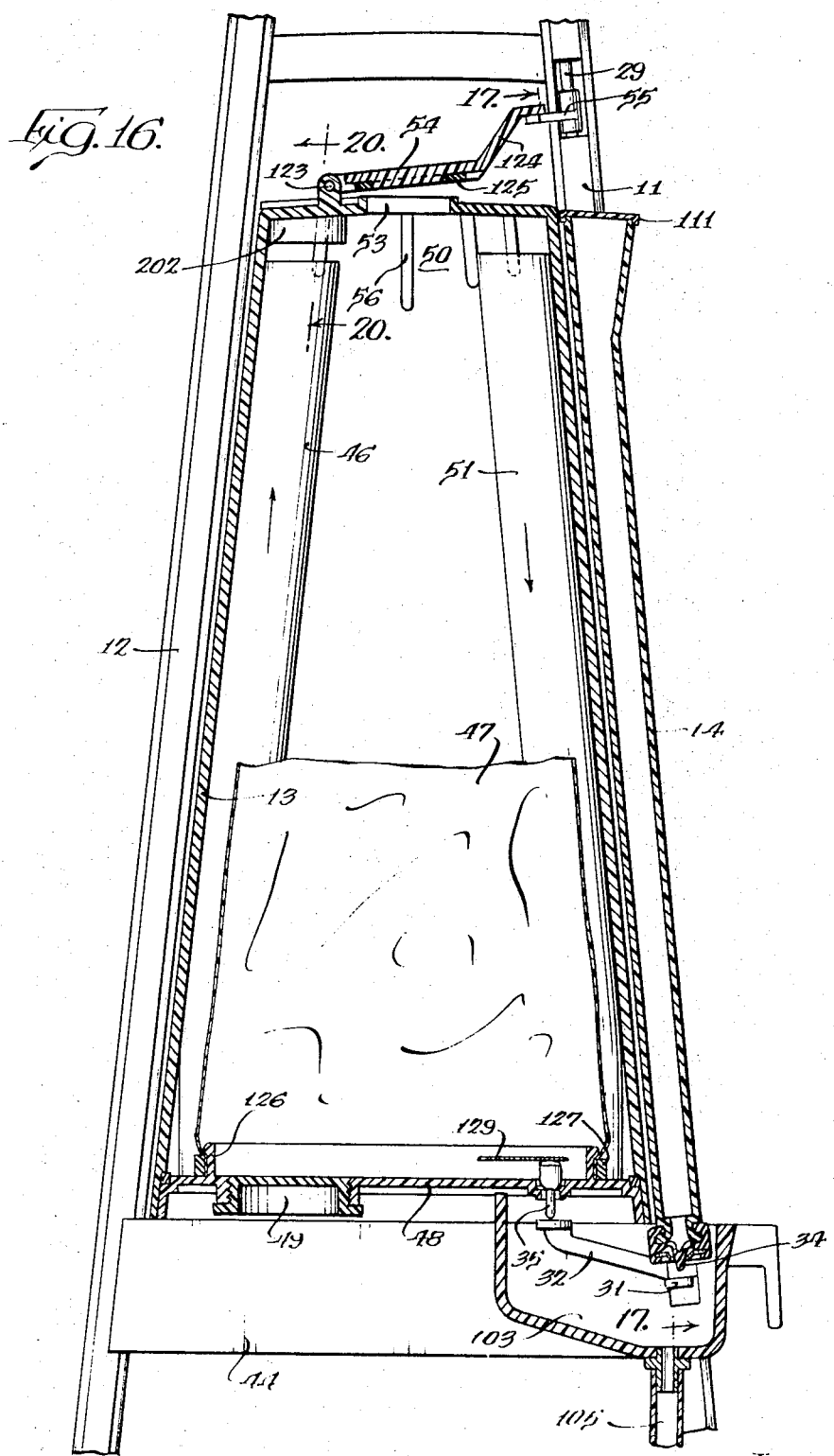

Nov. 17, 1970 G. R. WOLTER ET AL 3,540,072
FLOOR CONDITIONER
Filed Aug. 3, 1964 13 Sheets-Sheet 9
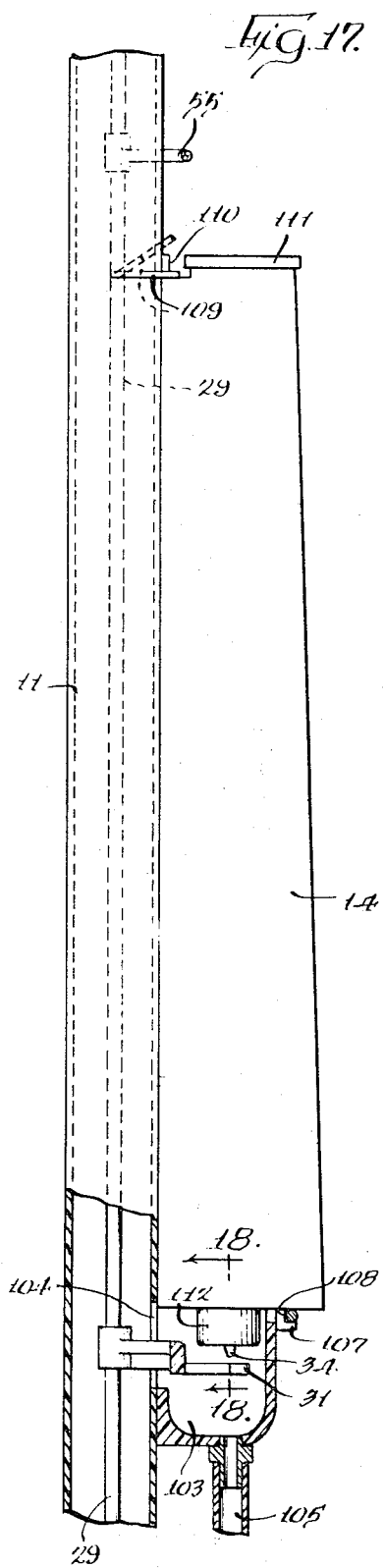
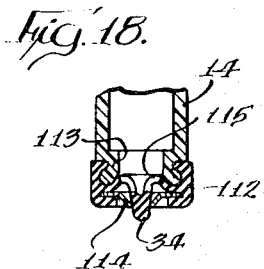
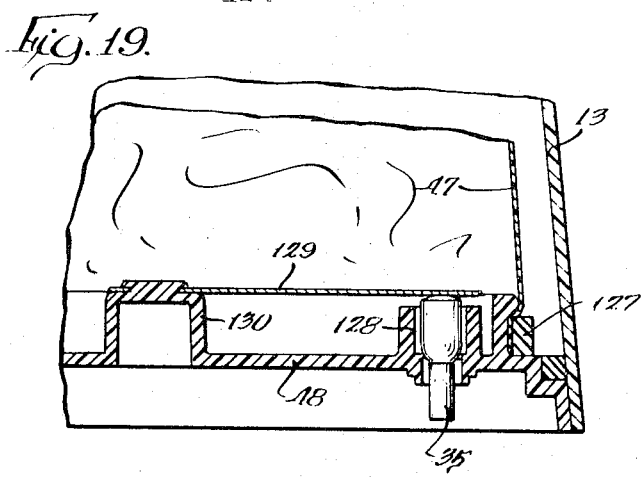
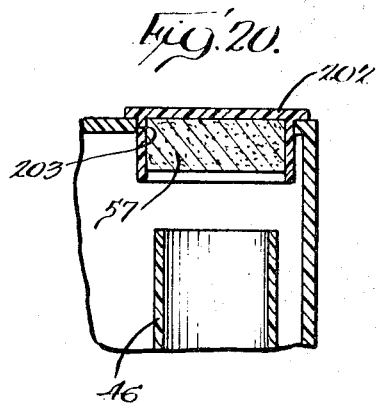
Inventors:
Gilbert R. Wolter
Alfred F. Ernstberger
Frederick J. Ritter
By George R. Clark Atty

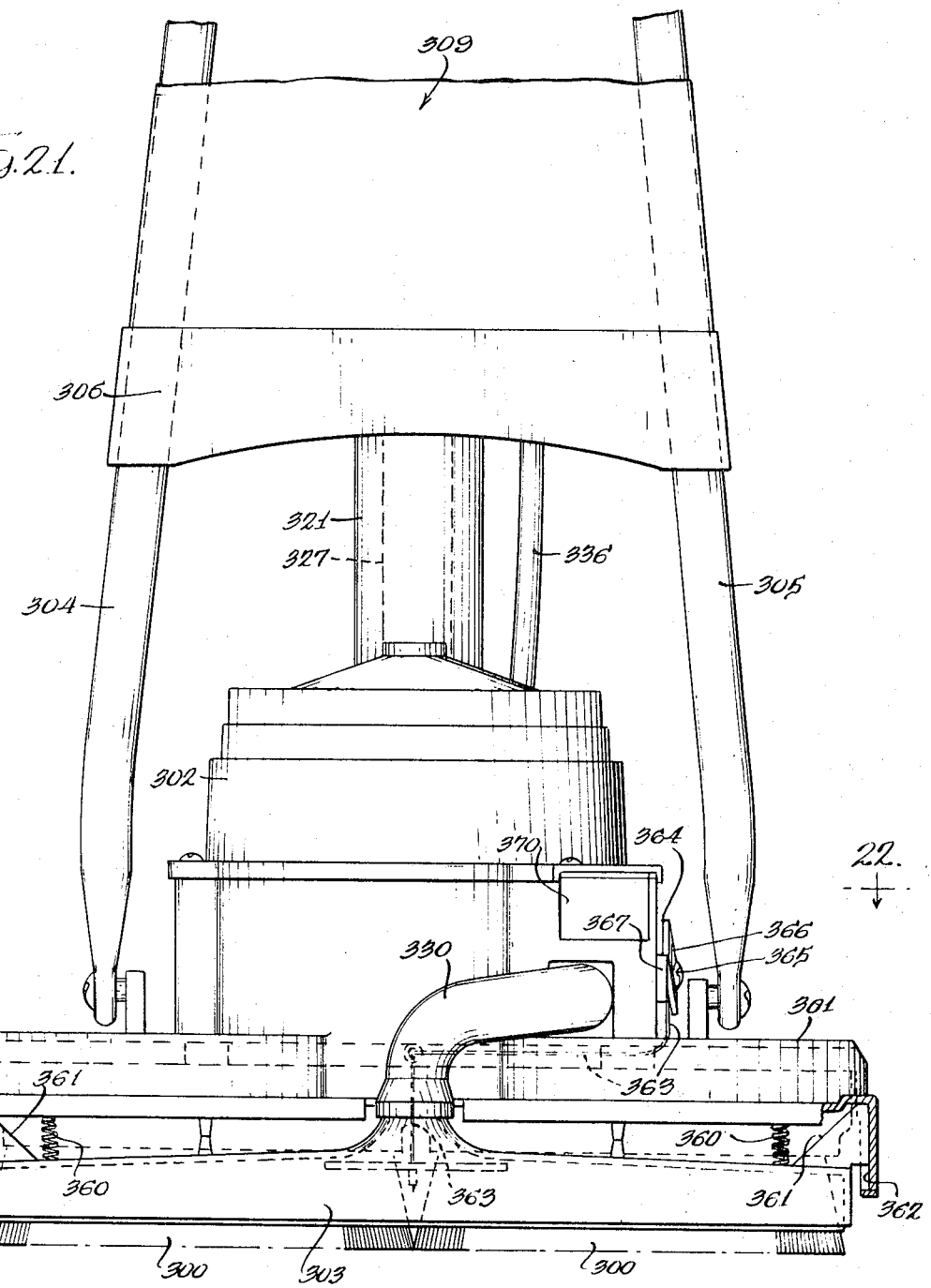

Nov. 17, 1970  G. R. WOLTER ET AL  3,540,072
FLOOR CONDITIONER

Filed Aug. 3, 1964  13 Sheets-Sheet 11

Inventors:
Gilbert R. Wolter
Alfred F. Ernstberger
Frederick J. Ritter
By
George R. Clark Atty

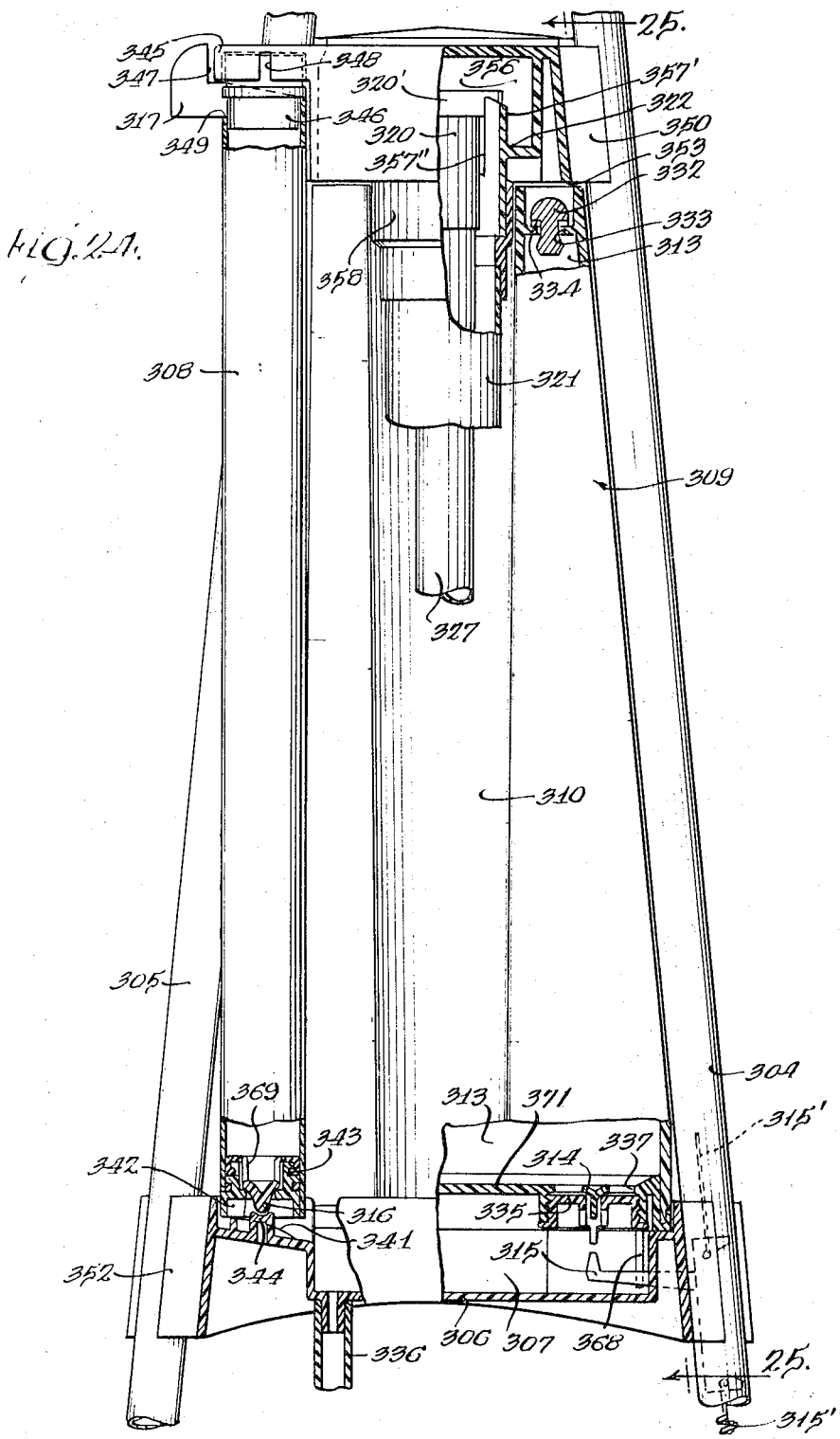

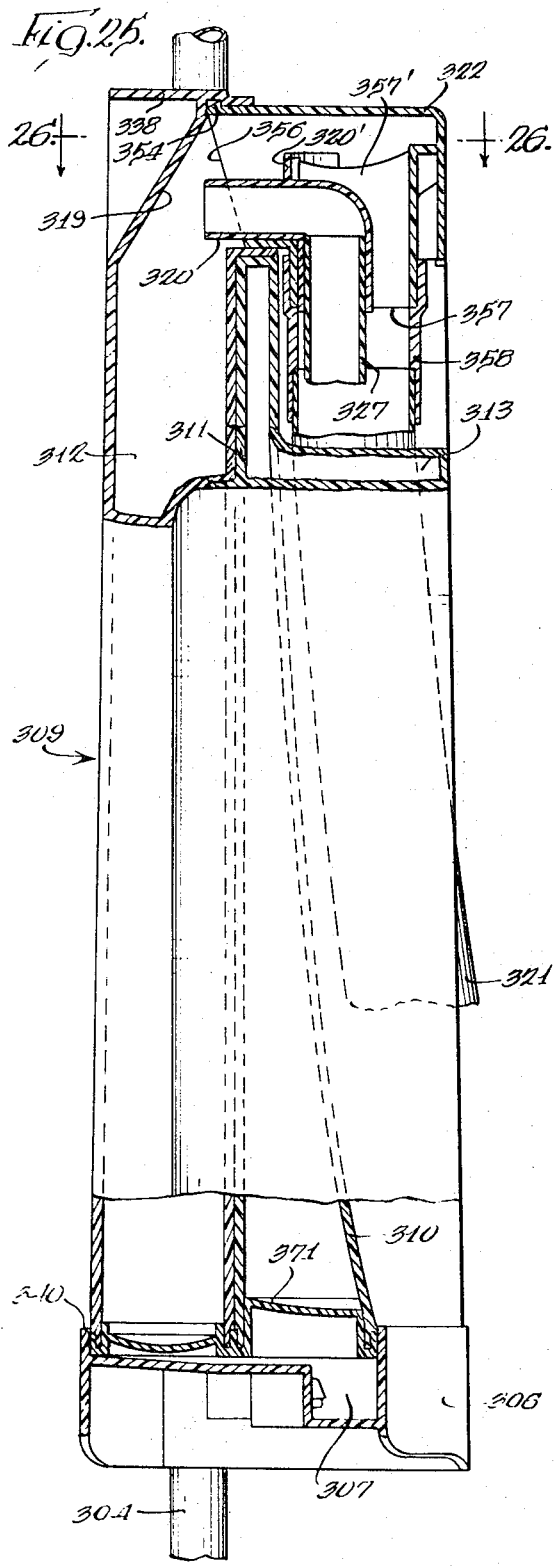
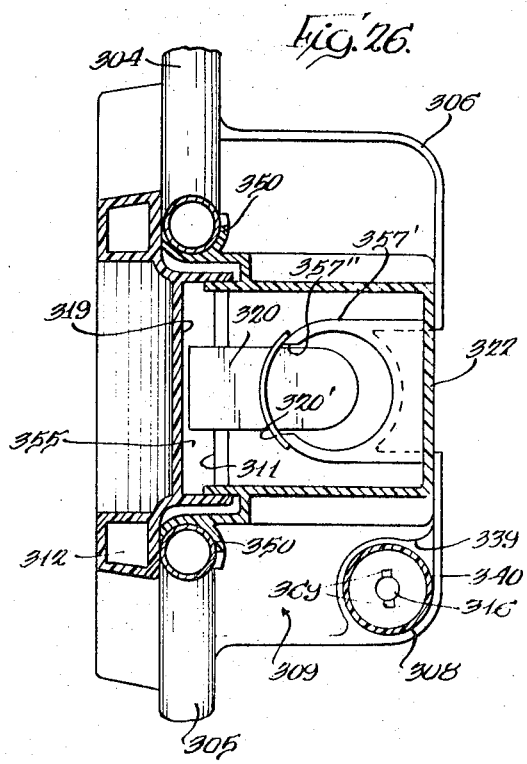
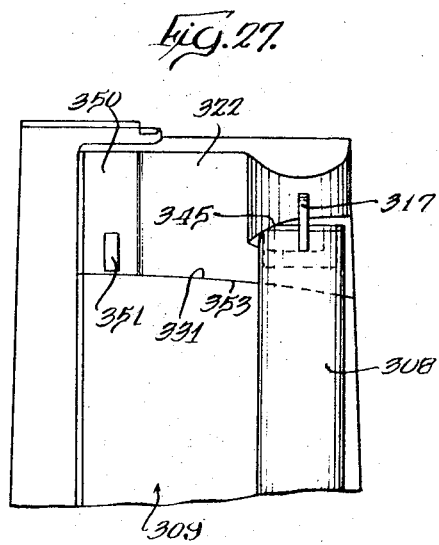

United States Patent Office 3,540,072
Patented Nov. 17, 1970

3,540,072
FLOOR CONDITIONER
Gilbert R. Wolter, Elmhurst, Alfred F. Ernstberger, Broadview, and Frederick J. Ritter, Chicago, Ill., assignors to Sunbeam Corporation, Chicago, Ill., a corporation of Illinois
Filed Aug. 3, 1964, Ser. No. 386,845
Int. Cl. A47l 11/30
U.S. Cl. 15—320       5 Claims This invention relates to a floor conditioner, and more particularly, to a device which will scrub and dry floors.

It is an object of this invention to provide an improved floor scrubber and dryer.

It is a further object of this invention to provide an improved floor scrubber and dryer which will wet scrub and suction dry floors.

It is a further object of the invention to provide a floor scrubbing device which will wet scrub floors with a cleaning solution carried by and dispensed by the device, and then suction dry the scrubber floors.

It is a still further object of the invention to provide an improved floor scrubber and dryer which will also wax and polish floors and shampoo rugs.

Briefly, in the invention, floor scrubbing is done by power driven means such as motor operated brushes as contrasted to manual scrubbing. Additionally, power driven suction means is provided for drying the floors. The floors are wet scrubbed with a cleaning solution carried by and dispensed by the floor scrubber. In the preferred form of the invention fresh water is also carried by and dispensed by the floor scrubber. This makes is possible to vary the strength of the cleaning solution, and also to rinse the floors with fresh water. The waste water which is picked up by the device during floor drying is stored by the device until such time as the waste water can be thrown away. In the preferred form of the invention the fresh and waste water are stored in a single container which is divided into two approximately inversely variable volumes by a flexible bag. When the bag is filled with fresh water it nearly completely fills the container. However, as fresh water is used its reduction in volume provides space inside the container for storing the waste water. In this manner, approximately equal volumes of fresh and waste water can be carried by and stored on the device with a minimum size container.

The features of the invention which are believed to be novel are set forth with particularity in the appended claims. The invention itself, however, both as to its organization and operation, together with further objects and advantages thereof, may best be understood by reference to the following description taken in connection with the accompanying drawings.

In the drawings, FIG. 1 is a front perspective view of a preferred form of the invention;

FIG. 2 is a partly exploded rear perspective view of the device;

FIG. 4 is a sectional view taken along the section line 4—4 of FIG. 3 with the motor cover and handle removed;

FIG. 5 is a sectional view taken along the section line 5—5 of FIG. 4;

FIG. 6 is a sectional view taken along the section line 6—6 of FIG. 4;

FIG. 7 is a bottom view of the device with the brushes removed;

FIG. 8 is an enlarged sectional view taken along the section line 8—8 of FIG. 7;

FIG. 9 is an enlarged sectional view taken along the section line 9—9 of FIG. 5;

FIG. 10 is a sectional view taken along the section line 10—10 of FIG. 9;

FIG. 11 is a bottom view of the upper end of the control handle with its bottom cover removed to expose the manual control mechanism;

FIG. 12 is a sectional view taken along the section line 12—12 of FIG. 11;

FIG. 13 is a sectional view taken along the section line 13—13 of FIG. 11;

FIG. 14 is a sectional view taken along the section line 14—14 of FIG. 3;

FIG. 15 is a sectional view taken along the section line 15—15 of FIG. 3;

FIG. 16 is a sectional view taken along the section line 16—16 of FIG. 15;

FIG. 17 is a sectional view taken along the section line 17—17 of FIG. 16;

FIG. 18 is an enlarged sectional view taken along the section line 18—18 of FIG. 17;

FIG. 19 is an enlarged sectional view taken along the section line 19—19 of FIG. 15;

FIG. 20 is an enlarged sectional view taken along the section line 20—20 of FIG. 16;

FIG. 21 is a broken-away front elevation view of another form of the invention;

FIG. 24 is a broken-away rear elevation view of device;

FIG. 25 is a sectional view taken along the section line 25—25 of FIG. 24;

FIG. 26 is a sectional view taken along the section line 26—26 of FIG. 25; and

FIG. 27 is a broken-away side elevation view taken from the left hand side of FIG. 24.

Figure 3:
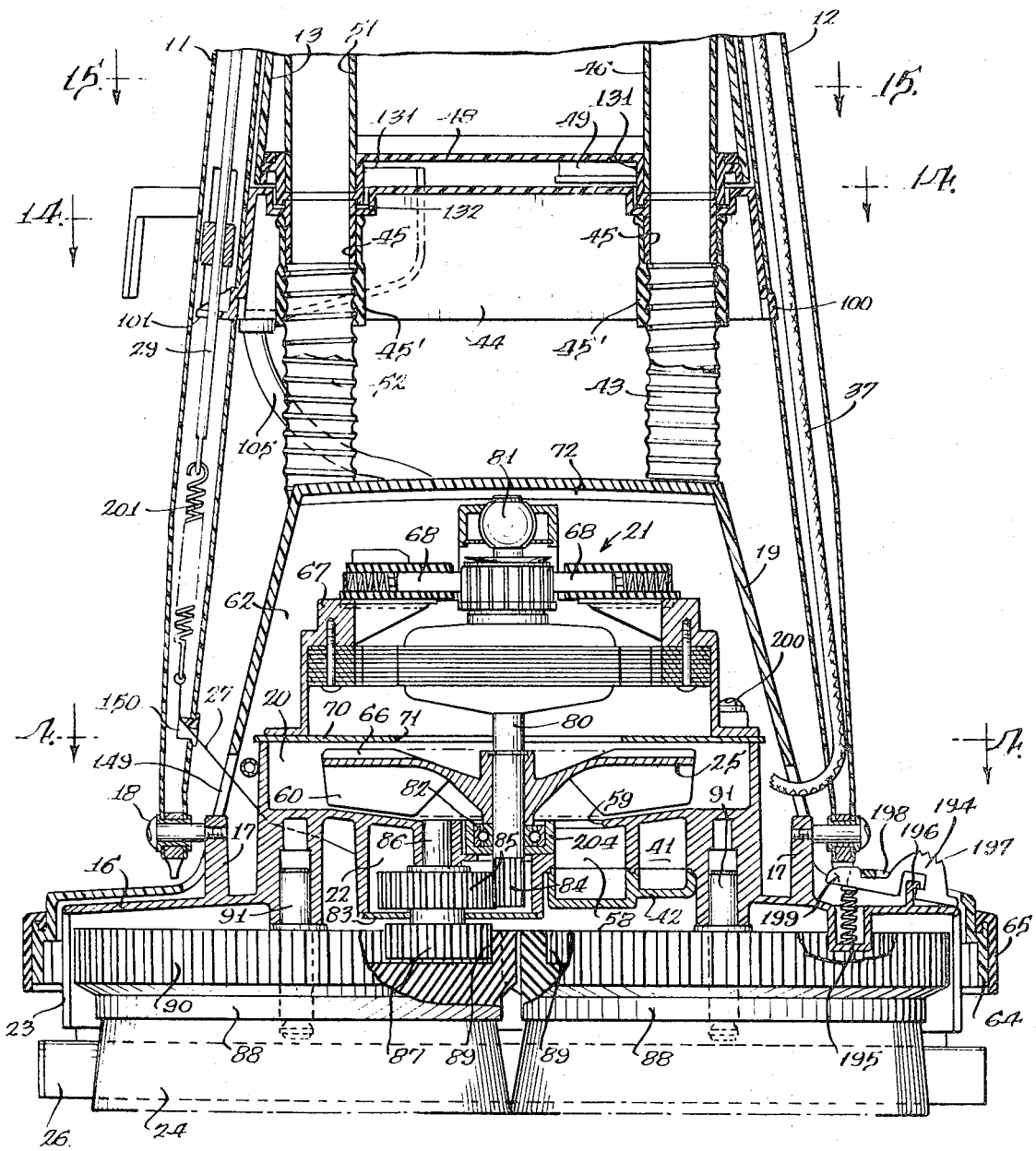
FIG. 3 is an enlarged and broken away sectional view taken on the section line 3—3 of FIG. 1.
Figure 22:
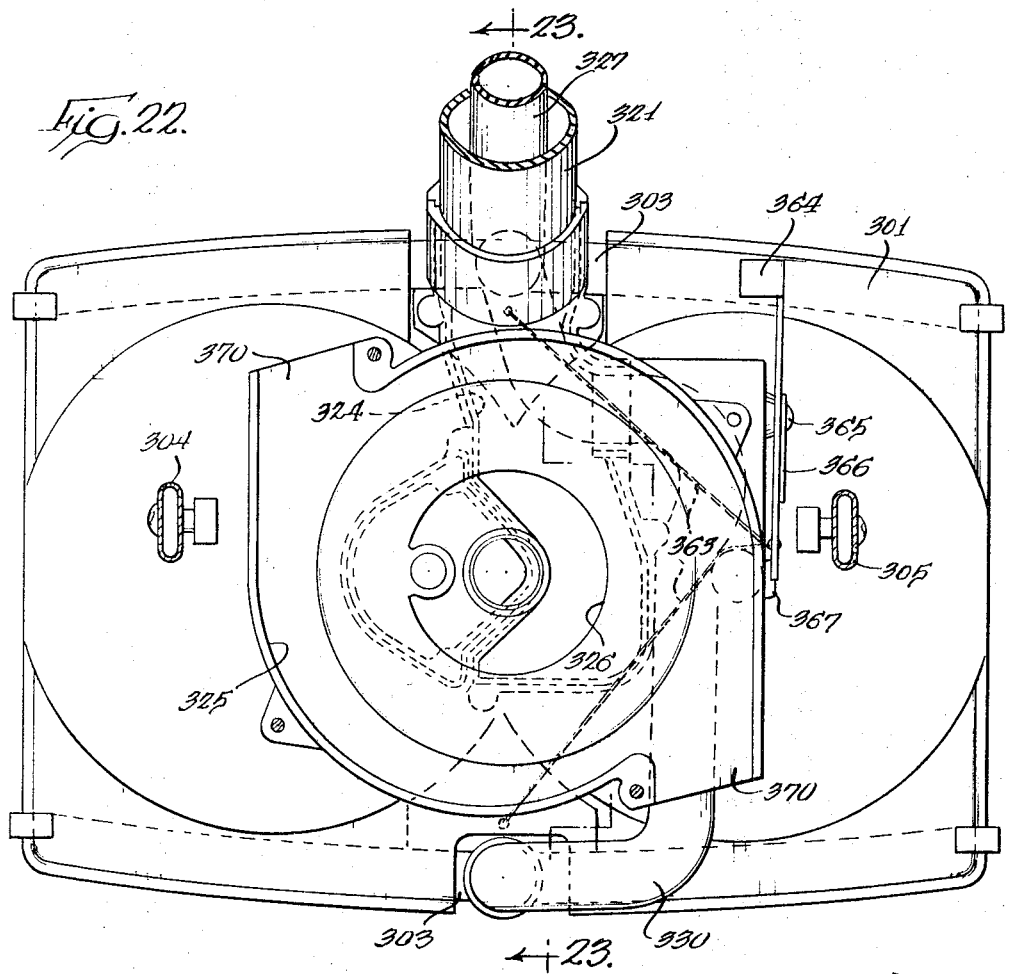
FIG. 22 is a sectional view taken along the section line 22—22 of FIG. 21.
Figure 23:
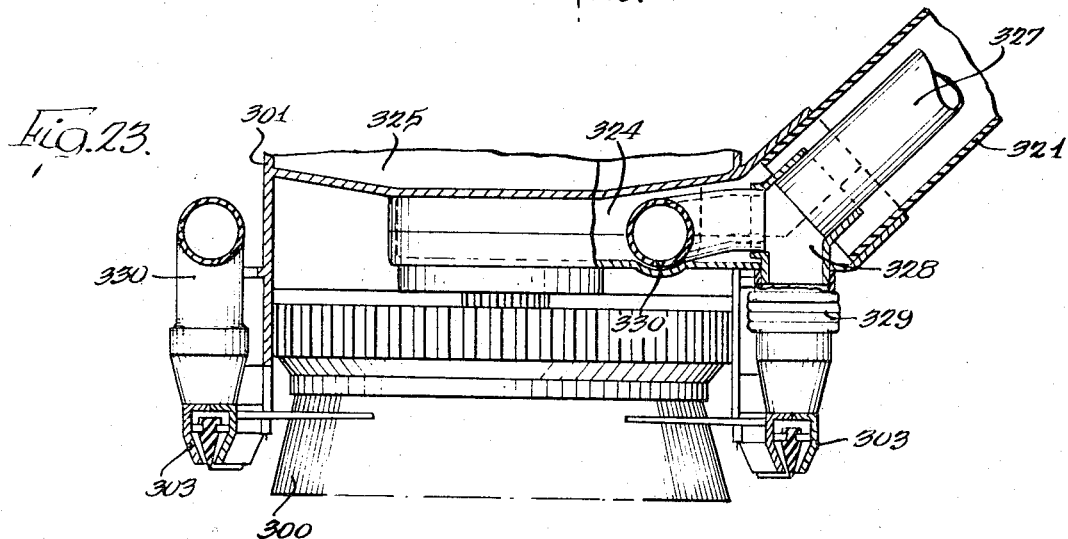
FIG. 23 is a sectional view taken along the section line 23—23 of FIG. 22.

Referring first to FIGS. 1 and 2, the device comprises an upper hand grip portion 10 having two handle legs 11 and 12 which are arranged with respect to each other in the form of a narrow inverted V-shape. Two containers 13 and 14 are positioned along the handle legs 11 and 12 for support by a cross member 44 in a manner to be described hereinafter. Container 13 actually is a tank having two compartments, hereinafter described, for storing fresh and waste water. Container 14 is a tank for storing a cleaning solution such as a concentrated soap solution or liquid detergent. The two containers or tanks 13 and 14 are removably mounted on the device. The hand grip portion 10 is provided with a manual control 15 for selectively dispensing fresh water from the tank 13 and cleaning solution from the tank 14 in a manner which will be described in greater detail hereinafter.

Referring now also to FIG. 3, the handle 10–12 is pivoted at its lower end on a frame member 16. Opposite sides of frame 16 have a lug 17 formed thereon for pivotally supporting the lower ends of the handle legs 11 and 12 on pivot pins 18. An outer cover or housing 19 is superposed over the frame member 16.

The upper end of frame member 16 is provided with an integrally formed fan chamber 20. Positioned above the fan chamber is a motor indicated generally by reference numeral 21. Formed below the fan chamber is a motor indicated generally by reference numeral 21. Formed below the fan chamber 20 is an integral speed reduction gear box or chamber 22. Referring also to FIG. 7, a semicircular depending flange or skirt portion 23 is integrally formed on frame member 16 on opposite sides thereof. A pair of scrubbing brushes 24, or alternately polishing or rub shampooing brushes, are disposed beneath the frame member 16 within the depending skirts 23. The weight of the device is supported on a floor by the scrubbing brushes 24. As will be described hereinafter, the motor 21 drives a fan 25 disposed in fan chamber 20 for purposes of creating a suction to dry wet floors. The motor 21 also drives the brushes 24 to power scrub a floor as contrasted to manual scrubbing. The weight of the device resting on the brushes 24 provides sufficient scrubbing pressure at the brushes 24 so that it is unnecessary to manually bear down on the brushes 24 in order to satisfactorily clean floors.

Referring now also to FIG. 5, the floor is suction dried by a pair of suction nozzles 26 disposed crosswise of the front and rear of frame member 16. These nozzles 26 are mounted for up and down movement in a manner to be described. That is to say, they can be lowered to engage the floor during the floor drying operation. Lowering and raising of the nozzles 26 is accomplished by control wires 27 connected to the nozzles and passing over rollers 28. The control wires 27 are connected to a control rod 29 which is disposed within the handle leg 11 which is hollow, see FIG. 3. The control rod 29 is tied in with the manual control knob 15 in a manner to be described hereinafter in greater detail.

Referring also to FIG. 14, the control rod 29 has mounted thereon a valve actuator 30. Valve actuator 30 has two fingers 31 and 32. Finger 31 actuates a valve 34, see FIG. 17, at the lower end of container 14 to control dispensing of cleaning solution. The finger 32 actuates a valve 35, see FIG. 16, to control dispensing of fresh or rinse water from the container 13.

The on or off condition of motor 21 is controlled by an electric switch 33, see FIG. 12, disposed in the hand grip portion 10. An electric extension cord 36 is brought into the hand grip portion 10, and an electric cord 37 also extends down through the handle leg 12 for connection to the motor 21, see FIG. 3. The leads of the cords 36 and 37 are connected to each other and the switch 33 in a manner which will be obvious to those skilled in the art. The switch 33 has a manual control switch button 38 for turning the motor 21 on and off.

Referring now to FIGS. 3 through 7, during floor drying or water pickup the motor 21 rotates the fan 25 to create suction and the nozzles 26 are lowered to engage the floor. The nozzles 26 are connected by flexible conduits 40 to a wet air channel or passageway 41. The conduits 40 are relatively short and are flexible by being constructed from wire reinforced plastic hose material. The channel 41 is integrally formed on the underside of base member 16 above the right-hand brush 24 when viewing FIG. 3. Channel 41 extends from the front to the back of frame member 16, and channel 41 is closed by a cover member 42. The wet air passageway or channel 41 is connected at its rear end to a flexible hose 43. Hose 43 extends up from channel 41 through the cover 19 to cross member 44, see also FIG. 2, of the handle structure 11, 12. At the cross member 44 the hose 43 is connected by a flexible sleeve 45' to a depending tubular connector 45 formed integrally on cross member 44, see FIG. 3. Member 44 supports the weight of the tanks or containers 13 and 14. The container 13 has a wet air tube 46 which extends lengthwise of container 13 from the connector 45 up to its upper end, see FIG. 16. Wet air tube 46 is open at its upper end and discharges into the container 13.

The container 13 is divided into two distinct compartments. One compartment is provided inside a flexible bag 47. Bag 47 is inverted and sealed closed at its lower open end to the bottom 48 of container 13. The bottom 48 has a filler plug 49 for purposes of filling bag 47 with fresh water. Fresh water is dispensed from bag 47 by the valve 35 mounted on the bottom 48 of container 13. Bag 47 is constructed from flexible plastic or the like so as to be collapsible. When bag 47 is filled with fresh water it occupies nearly all of the inside volume of container 13. However, as fresh water is used bag 47 decreases in volume. The decrease in volume provides space or another compartment within container 13 and about bag 47 for storing waste water brought into container 13 via tube 46.

In other words, the part of container 13 inside bag 47 can be viewed as a fresh water tank and the part of container outside of bag 47 can be viewed as a waste water tank with the two tanks having approximately inversely variable volumes. Actually, the volume inside tank 13 is slightly larger than the volume inside bag 47. This is because tank 13 must hold waste liquid which is the sum of the fresh water in bag 47 and the cleaning solution in tank 14. In addition, as a safety feature to prevent accidental overfilling of tank 13 its volume is slightly in excess of that required to hold the summation of the liquids in bag 47 and tank 14. However, the volume inside tank 14 and the additional volume inside tank 13 to provide a measure of safety against overfilling are relatively small compared to the volumes inside bag 47 and tank 13. Therefore, generally speaking, the volumes inside bag 47 and tank 13 are approximately inversely variable with respect to each other. In this manner the device in effect can carry or handle fresh and waste water volumes each of which is about equal to the total space inside tank 13.

The upper end of container 13 comprises a separating chamber or area 50. Separating chamber or area 50 is where moisture or droplets of water are removed from the incoming wet air stream. After the moisture or droplets of water are removed from the wet air stream the dry air travels down container 13 through a dry air tube, passageway or conduit 51. Tube 51 is open at its upper end, and at its lower end it is connected by another connector 45 integral with cross member 44 and another flexible sleeve 45' to a flexible hose 52.

In FIG. 16 a vent opening 53 formed in the upper end of container 13 is indicated as being open. Closure of vent opening 53 is accomplished by dropping a pivoted cover member 54 onto the opening 53. The cover member 54 is controlled by an atmospheric vent operating finger 55 carried by the same control rod 29 which carries the valve actuator 30 and operates the suction nozzle pull wires 27. When the floor is being dried the valves 34 and 35 are closed, the suction nozzles 26 are lowered, and the vent opening 53 is closed. All this is accomplished by operating the manual control 15, and of course the motor 21 is energized to operate the fan 25 to create a suction. The separating chamber 50 is provided with air stream deflectors 56. The wet air stream exiting from the upper end of tube 46 strikes the upper end of container 13 and the air deflectors 56. Before the air can continue out of container 13 by way of a dry air tube 51 the air stream must travel over or around the deflectors 56 in serpentine fashion. As it does this its moisture or water droplets fall by gravity into the main tank 13 about the fresh water bag 47. Just above the open upper end of tube 46 a desudser bar or cake 57 is provided, see FIG. 20. The waste water wet air stream impinges on the desudser bar so as to break down soap or detergent bubbles present in the incoming wet air stream. If soap bubbles or foam were allowed to enter container 13 they might eventually make way through the tube 51 into the motor and fan unit mounted on base member 16 and cause corrosion or clogging. The desudser bar or cake 57 is mounted in a hollow removable plug 202 which is inserted into an opening 203 formed in the top of container 13 opposite to the upper end of tube 46. In this manner the desudser bar 57 which is gradually eroded can be replaced.

After the wet air stream loses its moisture by impinging on the walls and baffles of the separating chamber 50 the dry air continues down through tube 51, connector 45, and flexible hose 52 into an inlet channel or passageway 58 for the suction fan 25, see FIGS. 3 and 7. Similar to the wet air channel 41, the dry air channel or passageway 58 is also integrally formed on the underside of frame member 16 above the right-hand brush 24 when viewing FIG. 3. The channel 58 is also closed by the cover member 42 which closes the channel 41. Channel 58 extends from the rear of frame 16 to about its central portion along side the gear box or chamber 22. That is to say, the channel 58 is disposed between the gear box 22 and the channel 41. At the center of frame 16 channel 58 terminates at an inlet opening 59 to the fan chamber 20. The dry air entering fan chamber 20 via passageway 58 and fan inlet opening 59 is picked up by the lower blades 60 of the fan 25 and pushed out of the fan chamber 20 through its tangential exhaust opening 61 into the space 62 provided between the cover member 19 and the base member 16 and motor 21. This fan exhausted air is vented through the peripheral spaces 63, see FIG. 5, between the cover 19 and frame member 16 onto the floor. When the air strikes the floor it promotes drying of any thin water film or moisture which may be left on the floor by the suction nozzles 26 due to their inability to remove the same.

The motor 21 is cooled by virtue of upper fan blades 66 formed on the suction fan 25. The motor 21 is provided with a casing 67. The upper end of casing 67 which supports the commutator brushes 68 is in the form of an open spider providing vents 69, see FIG. 5. The motor casing 67 is mounted on the frame member 16 above the fan chamber 20 by screws or the like 200. A plate 70 separates the interior of motor casing 67 from the fan chamber 20. Plate 70 is provided with a central aperture 71. The upper end of cover 19 is provided with air inlet openings 72. Therefore, when fan 25 is rotating cooling air will be drawn into cover 19 through opening 72 and then past the brushes 68 into the motor casing 67 and then through the opening 71 into the fan blades 66 after which the motor cooling air will be exhausted out of the fan chamber 20 through its tangential exhaust 61. The cover 19 is provided with a peripheral and depending flange or skirt 64 which surrounds the periphery of the frame member 16, and flange or skirt 64 is provided with a resilient or rubber bumper 65.

The armature shaft 80 of motor 21 extends through the opening 71 into fan chamber 20 and then into the gear box 22. Fan 25 is mounted on armature shaft 80. An upper bearing 81 for armature shaft 80 is supported by the motor casing 67. A lower bearing 82 is provided for the lower end of shaft 80 between the fan 25 and gear box 22. The lower bearing 82 is positioned in an electrical insulating material bearing retainer 204 (see FIG. 4) which is connected to the frame 16 within the gear box 22. Gear box 22 is integrally formed on the underside of frame member 16 above the left-hand scrubbing brush 24 when viewing FIG. 3. Grease is provided in the gear box 22 for its gears, and the gear box is closed by a cover 83. The lowermost end of armature shaft 80 which extends into gear box 22 is provided with a gear 84. Gear 84 meshes with a larger gear 85 to provide a speed reduction. Gear 85 is mounted on a shaft 86 carried by an integral portion of the base member 16. Another gear 87 is provided on shaft 86. The gear 87 is keyed to the gear 85. However, gear 87 is positioned outside gear box 22. The brushes 24 have backing members 88 which are provided with internal and external gears 89 and 90 respectively. The brushes are identical so they can be interchanged. The gear 87 engages the internal gear 89 of the left-hand brush when viewing FIG. 3. However, the external gears 90 of both brushes are engaged so that when gear 87 drives the left-hand brush the right-hand brush is simultaneously driven. The brushes 24 are rotatably mounted on shafts 91 which are carried in integral depending portions of the frame member 16. The brushes 24 are removably mounted on the shafts 91 in a manner which will be obvious to those skilled in the art for replacement by polishing or rug shampooing brushes. The drive mechanism for the brushes 24 is similar to the drive mechanism disclosed and claimed in Jepson et al. Pat. No. 3,102,292 granted on Sept. 3, 1963 and assigned to the same assignee as the instant application.

It was noted above that the retainer 204 for bearing 82 is constructed from electrical insulating material. The same is true of the plate 70 and the gear 85. For example, bearing retainer 204 can be constructed from phenolic, the plate 70 from insulating fiber board, and the gear 85 from nylon. These insulating material parts provide a double insulation feature for the device.

Referring now to FIGS. 2, 3, 14, 16 and 17, the dispensing of fresh water and cleaning solution will now be described. The cross member 44 is actually U-shaped in transverse and lengthwise cross section. It has tabs or lugs 100 and 101 formed on its right and left-hand ends respectively when viewing FIG. 3. The member 44 is received between the handle legs 11 and 12. The lugs 100 and 101 enter suitable apertures formed in the handle legs to retain member 44 in position. The opposite ends of member 44 also have protruding spaced edges 102, see FIG. 14, which embrace or partially straddle the handle legs. The lug 101, see FIG. 3, is slotted to embrace the control rod 29 to assist in guiding it in its up and down movement. Formed on the rear right-hand side of member 44 when viewing FIG. 2 is a mixing chamber or manifold 103. The chamber 103 is integrally formed on cross member 44. Chamber 103 is disposed immediately beneath the fresh water valve 35 and the cleaning solution valve 34, see FIG. 16. The valve actuator 30 which is connected to the control rod 29 extends through aligned openings 104, see FIG. 17, formed in the handle leg 11 and side wall of mixing chamber 103 into the mixing chamber. The mixing chamber 103 is connected by a flexible conduit 105 to a tube 106, see FIG. 6. Flexible conduit 105 is connected to tube 106 by inserting it through an aperture formed in the rear central portion of cover 19, see FIG. 2. Tube 106, see FIG. 6, is mounted in frame member 16 and extends therebelow to in front of the rear suction nozzle 26 in closely spaced relationship to the floor. The vertical spacial relationship of the valve actuating fingers 31 and 32 for the cleaning solution valves 34 and fresh water valves 35 respectively are such that when control rod 29 is raised finger 32 first lifts the valve 35 to dispense fresh water into the chamber 103. The flexible conduit 105 and the tube 106 conduct the water to the floor. If in addition, cleaning solution is desired, the control rod 29 is raised slightly further whereby the finger 31 will raise the cleaning solution valve 34 to dispense cleaning solution into the chamber 103. If both valves 34 and 35 are simultaneously open the cleaning solution and fresh water will be mixed in the chamber 103 before the liquid is deposited on the floor. Therefore, chamber 103 is a mixing chamber or manifold for mixing the cleaning solution and the fresh water. In this manner, the strength of the cleaning solution can be varied. However, if it desired merely to rinse the floor with water when control rod 29 is raised only sufficiently to open the fresh water valve 35 and not the cleaning solution valve 34.

The tank or container 14 is supported along the back side of handle leg 11. At its lower end the tank 14 seats on the cross member 44. Its lower end has a hook 107, see FIG. 17, which is received by an integral eyelet 108 on the back wall of mixing chamber 103, see FIG. 14. The upper end of container 14 is retained in position by a ring 109, see FIG. 17, which is pivotally connected to the handle leg 11 and is adapted to latch onto an integral projection 110 formed on the upper end of tank 14. The upper end of tank 14 is closed by a removable filler tap 111. In order to remove tank 14 it is only necessary to raise the ring 109 and then unhook the hook 107.

Referring to FIG. 18, the valve 34 comprises an integral internal part of a resilient or rubber collar 112. Collar 112 is fitted unto a necked portion 113 at the lower end of container 14. A valve set 114 is carried by the annular member 112. Valve 34 protrudes through the central opening in valve seat 114 and is self-biased to closed position. The integral part connecting valve 34 and collar 112 is provided with slots 115. Therefore, when the valve element 34 is raised the cleaning solution will flow out through the openings 115 and the apertured valve seat 114.

The main tank or container 13 is assembled on the cross member 44 and between the handle legs 11 and 12. This is accomplished by passing the container 13 between the handle legs from the front of the device. Opposite sides of the container have a pair of curved members 121 which receive and seat the handle legs, see FIGS. 2 and 15. Opposite sides of container 13 also have lengthwise extending edges 122 which limit rearward movement of the container between the legs when it is being assembled into position. The upper end of container 13 has a hand grip or carrying handle 120 integrally formed therewith. When container 13 is being assembled or removed, the atmospheric vent control element 55 does not have to be disturbed. This is because the cover member 54 is not fixed thereto but loosely engaged thereby in the manner illustrated in FIG. 16. This same feature is built into the valve control 30 for the cleaning solution container 14 and the main container 13. That is to say, both containers can be readily assembled or removed without disturbing the valve actuating fingers 31 or 32 inasmuch as they are not fixed to either container or their vlave structure. The cover 54 for vent 53 is pivoted on the top of main tank 13 by a pivot pin 123. Cover 54 is provided with an integral extension 124 which extends toward the actuator 55 for engagement thereby to lower or raise cover 54. A seal 125 is provided on the underside of cover 54 to sealingly close the rim of atmospheric vent opening 53. The bottom open end of bag 47 is sealed closed by virture of an oval shaped integral sealing ring 126 formed on the container bottom 48. Valve 35 and filler opening 49 are positioned within the marginal outline of sealing ring 126. The lower edge of bag 47 is sealed to the ring 126 by an annular resilient strap 127.

Referring also to FIG. 19, the valve element 35 operates within a valve seat 128 integrally formed in the main tank bottom 48. The valve element 35 is biased to closed position by a leaf spring 129 supported off an integral boss 130 formed on main tank bottom 48. When valve element 35 is lifted off its valve seat 128 fresh water which is in the flexible bag 47 will pour out of the valve seat 128 into the mixing chamber 103.

Referring to FIG. 3 and FIG. 15, it will be seen that the wet air and dry air tubes 46 and 51 respectively are positioned along the front face of container 13 exteriorly of the bag 47. At their lower ends tubes 46 and 51 are sealingly received in tubular connectors 131 integrally formed on the bottom 48. The connectors 131 are seated in the recessed upper ends of connectors 45. The recessed upper ends of connectors 45 are provided with seals 132 to seal the connectors 131 and 45 together.

In order to remove the main tank 13 it is merely necessary to push it forwardly to disengage its lugs 121 from the handle legs 11 and 12. Assuming that the bag 47 is empty and the tank 13 is filled with waste water, the tank 13 is hand carried to a sink or the like. Then it is turned upside down and the waste water is discharged from tank 13 through the vent opening 53. After this the filler opening 49 is opened to refill the bag 47 with fresh water. If there is fresh water in bag 47, and it is desired to empty the bag 47 this can be accomplished by depressing the valve 35 or removing the filler opening 49. Inasmuch as the bag 47 has its filler opening provided at the bottom of tank 13 the bag 47 cannot be filled without first inverting the tank 13 which automatically empties its waste water. Although a separate container 14 is provided for concentrated cleaning solution, it will be obvious to those skilled in the art that a cleaning solution can be placed directly in the bag 47 as contrasted to merely clear rinse water. In such event, the tank 14 can be omitted. However, it is preferred to store concentrated cleaning solution in tank 14 and just clear water in bag 47. This way the strength of the cleaning solution can be varied and fresh rinse water is provided for removing soap films and the like off the scrubbed floor. Nevertheless, bag 47 can be used as a fresh water or cleaning solution receptacle. That is to say, in the broadest aspects of the invention the water in bag 47 can be viewed as a cleaning liquid.

Referring now to FIGS. 5 through 10, the details of the suction nozzles 26 will be described. The suction nozzles 26 comprise two complementary elongated members 140 and 141. Members 140 and 141 face each other to define an elongated suction nozzle therebetween. On their inside, the members 140 and 141 are provided with a plurality of spaced lugs 142. A flexible or rubber squeegee blade is clamped between the spaced lugs 142. By viewing FIG. 10 it will be seen that when the nozzle 26 is pushed to the left the blade 143 will be deflected rearwardly. The blade 143 will push water ahead of it and this water will be sucked into the suction nozzle between the blade 143 and the part 141. On the rear stroke of the suction nozzle the blade 143 will be deflected in the opposite direction and water will be sucked up into the suction nozzle between the part 140 and the blade 143. In other words, the blade 143 has a pivotal type mounting within the suction nozzle so that water is picked up on forward and back strokes of the nozzle.

The pull wires 27 which extend over the pulleys 28 for purposes of raising and lowering the suction nozzles 26 are connected to integral inwardly directed extensions 144 formed on the suction nozzle halves 141. The nozzles 26 are biased to lowered position by a pair of coiled springs 145 held captive between the opposite ends of the nozzles and the frame member 16, see FIG. 6. The nozzles 26 are provided with guide bars 146 adjacent to the coiled spring 145. These guide bars 146 slide in depending vertically disposed integral channels formed on the underside of frame member 16. In this manner the nozzles are vertically guided in their up and down movement. The nozzle pull wires 27 are connected to the extensions 144 and then pass over rollers 28 and then extend through an opening 148, see FIG. 7, formed in the frame member 16 adjacent to the right-hand brush shaft 91 when viewing FIG. 7. After passing through the opening 148 the pull wires extend through an opening 149 formed in the cover 19, see FIG. 3, and then into the handle leg 11 through an apertured guide plug 150. Pull wires are connected to the lower end of control rod 29 by a stiff coil spring 201 to permit further upward movement of the control rod 29 to operate the valves 34 and 35 even though the nozzles have reached the upper limit of their vertical travel. The right-hand side of cover 19 when viewing FIG. 3 and the handle leg 12 have aligned apertures similar to that formed on the left-hand side for passing the cord 37 to the motor 21.

Although the floor conditioner has so far been described as being useful in scrubbing and drying floors, its utility is not restricted thereto. The floor conditioner can be used to shampoo rugs, and this aspect of the invention will now be described with reference to FIGS. 4, 7 and 8. More particularly, the device is provided with a foam generator. As will be obvious to those skilled in the art, if rug shampooing liquid is deposited on a rug it will rapidly soak therethrough. When this happens, the rug shampooing liquid is not distributed throughout the surface of the rug. Therefore, the device includes a foam generator, best illustrated in FIG. 8. By referring to FIG. 4 it will be seen that there is another tangential exhaust for the fan chamber 20, indicated generally by reference numeral 160, which is diametrically disposed with respect to the tangential exhaust 61. The exhaust 160 discharges into a passageway 161 which in turn discharges into a venturi shaped passageway 162 and a screen 163. That is to say, a restriction 164 is provided in the air flow path 160 through 163. When one desires to shampoo rugs, a rug shampooing solution or detergent is placed in either tank 14 or bag 47 of tank 13. The flexible conduit 105 which is normally connected to the tube 106 is instead inserted through an opening 165 in the back of cover 19 for connection to a tube 166, see FIG. 4. The tube 166 extends into the passageway 161 and terminates at the restricted orifice or opening 164. When the valve actuator 30 is operated intermittently the rug shampooing detergent will be dispensed into the passageway 162 in droplet form. The air which is being exhausted by the fan through the air flow path 160 to 163 will convert these droplets of rug shampoo liquid into foam. This is by virtue of turbulence promoted in the air flow path and the screen 163. Due to the venturi shape of the air flow path, turbulence will be promoted and the droplets of liquid will be atomized and impelled against the screen 163. As the air exhausts through the screen 163 the atomized liquid is converted into bubble or foam form. The just described foam generator is similar to the one described and claimed in Gilbert R. Wolter et al. patent application Ser. No. 290,474, filed June 25, 1963, and assigned to the same assignee as the instant application.

The hand grip controls will now be described in detail by reference to FIGS. 11 to 13. The hand grip 10 actually comprises top and bottom members 170 and 171 respectively. When the handle is turned upside down all the control elements can be preassembled on the top member 170, and then the member 170 and its mounted controls are closed by the bottom 171. In other words, the bottom member 171 serves as a cover element. The members 170 and 171 are clamped together at their opposite ends by screws 172. The handle legs extend into the hand grip portion 10 between the members 170 and 171. When members 170 and 171 are clamped together this also clamps the handle legs 11 and 12 in their illustrated position.

The control rod 29 is moved up and down in the handle leg 11 by the thumb operated wheel 15. Wheel 15 has an eccentrically disposed groove or slot 173 which receives a right angle bent end portion 29′ of control rod 29. When the control rod end portion 29′ is disposed in that portion of groove 173 which is close to the axis of wheel 15 the rod 29 is raised, and when it is disposed in those portions of groove 173 further removed from the axis of wheel 15 the rod is lowered. The opposite ends of groove 173 define the upper and lower limits of movement of rod 29. The wheel 15 is provided with a bearing shaft 174 at its axis. Shaft 174 is rotatably supported by integral bearing portions 175 and 176 formed on top member 170 and bearing portions 177 formed on the bottom member 171. Guides 178 and 179 are formed on the member 170 for the rod 29, and member 171 is provided with a guide 180 for rod 29.

The members 170 and 171 are also provided with guides 181 and 182 respectively for a gear rack 183. Gear rack 183 is moved up and down by a gear wheel 184 keyed to shaft 174. As the thumb wheel 15 is rotated the gear rack 183 is moved up or down by the gear wheel 184 depending upon the direction of rotation of the thumb wheel 15. Gear rack 183 operates an indicator comprising a leaf spring 185 and indicator tip 186. The upper end of spring 185 is connected to the gear rack 183 and the indicator tip 186 is connected to the lower end of spring 185. Indicator tip 186 protrudes through a slot 187 formed in member 170 and cooperates with a suitable scale or dial 188, see FIG. 1, formed on the exterior of member 170.

The on-off switch 33 for controlling the motor 21 is mounted on the top member 170. The cord 36 has a knot in it just below the aligned bosses 189 and 189′ for the screw 172. The knot and the bosses provide a strain relief for cord 36. The free end of cord 36 is provided with a pronged plug 205 for connection to an electrical wall socket or the like. The other electrical cord 37 which extends through the handle leg 12 is supported off the guide 179 by a bracket 190. Bracket 190 grips the cord 37 tightly to provide a strain relief and also to keep cord 37 out of the way of the moving parts inside the hand grip such as the control rod 29, the thumb wheel 15 and the gear rack 183 and its indicator. As will be seen from FIG. 1, the electric extension cord 36 is stored on the floor conditioner in coil position. This is accomplished by providing cord storage hooks 191 and 192 on the bottom 171 of hand grip 10 and the cross member 44 along the leg 11. These hooks 191 and 192 may be integrally formed on the parts 171 and 44.

The scale 188 is marked with four positions for the indicator tip 186. The lowest position is a "dry" position, the next upper position is a "scrub or polish" position, the next upper position is a "dispense" position, and the uppermost position is a "soap" position. The indicator tip 186 and the control rod 29 move downwardly as the thumb wheel 15 is rotated in a down direction, and control rod 29 and indicator tip 186 move upwardly when the thumb wheel 15 is rotated in up or rear direction. At the dry setting, the pull wires 27 are lowered inasmuch as control rod 29 has been moved down. This permits the coil springs 145 to bias the suction nozzles 26 against the floor. In this setting of the device the valve actuator 30 has been lowered so that the two valves 34 and 35 are closed. The atmospheric vent actuator 55 is also lowered so that the vent opening 53 is closed by cover 54. With the switch button 38 moved to the on position the motor is energized to rotate the fan 25 and brushes 24. Operation of fan 25 creates a suction circuit along the path of suction nozzles 26, flexible hoses 40, passageway 41, flexible hose 43, connectors 45 and 131, tube 46, separating chamber 50, tube 51, connectors 131, tube 46, flexible hose 52, passageway 58, fan inlet opening 59, fan chamber 20, and then out through the tangential exhausts 61 and 160. Until the time that the air stream enters the separating chamber 50 the described suction path is a wet air stream. Moisture is removed from the wet air in separating chamber 50, and thereafter the suction circuit is a dry air stream.

In the scrub or polish setting of the device, the thumb wheel 15 is rotated rearwardly slightly which raises the control rod 29 a short distance. This pulls on the pull wires 27 against the bias of springs 145 to raise the suction nozzles 26 off the floor. The small upward movement of control rod 29 is not sufficient to raise the valve actuator 30 sufficiently to open either of valves 34 or 35. Therefore, these valves remain closed. However, this upward movement of control rod 29 is sufficient to raise the atmospheric vent control 55 to raise the cover 54 off the atmospheric vent opening 53. With opening 53 being uncovered the previously described suction part or circuit is opened or interrupted. Therefore, no suction is being drawn through the wet air stream path comprising suction nozzles 26, flexible hoses 40, passageway 41, flexible hose 43, connectors 45 and 131 and tube 46. Since the motor is still operating the fan 25 is being rotated. Atmospheric air is pulled by the fan into the casing 13 through opening 53. However, this incoming air is merely exhausted by the fan through the path comprising tube 51, connectors 131 and 45, flexible hose 52, passageway 58, inlet opening 59, fan chamber 20, and the tangential exhausts 61 and 160. The suction nozzles 26 remain in a raised position inasmuch as the bias of springs 145 is inadequate to rotate the thumb wheel 15 downwardly in order to lower the control rod 29 and pull wires 27. Assuming that the soap solution or fresh water or both have been previously dispensed onto the floor the brushes 24 which support the entire weight of the device will scrub or rinse the floor. After the brushes have adequately scrubbed or rinsed the floor the thumb wheel 15 can be rotated downwardly to lower the control rod 29 so that the suction nozzles 26 will engage the floor. This movement of rod 29 also closes the atmospheric vent 53 and the suction circuit so that the suction nozzles 26 can pick up the waste water off the floor. The device is moved back and forth along the floor by pushing and pulling on the handle 10. This is the only physical force which is required for scrubbing or mopping up the floor.

After the waste water has been picked up off the floor, the thumb wheel 15 can be rotated upwardly to set the device in the dispense position. Upward movement of control rod 29 raises the suction nozzles 26 off the floor and opens the vent 53. Additionally, in the dispense condition of the device the control rod 29 will have been raised far enough to cause the finger 32 of valve actuator 30 to open the valve 35. Inasmuch as fresh water will normally be stored in the bag 47, fresh water will be dispensed onto the floor through the valve seat 128, mixing chamber 103, flexible hose 105, and tube 106. It should be noted that since the vent 53 is open at this time the normal suction pressure in container 13 is broken so that the contents of bag 47 can flow freely by gravity. The rotating brushes will spread the fresh water on the floor area, and then the device is set at the scrub position so the brushes wash and remove any soap films or dirt not previously picked up. After this, the control knob 15 can be rotated downwardly to once again set the device in its dry condition and the rinse water will be picked up by the suction nozzles 26.

In order to dispense soap solution on the floor, the wheel 15 is rotated rearwardly to place the indicator 186 at the soap setting. At this setting the control rod 29 has been pulled all the way up. This results in raising of the suction nozzles 26, opening of the vent 53 and upward travel of the valve actuator 30 so as to first open the fresh water valve 35 and then the concentrated soap solution valve 34. In other words, in this setting of the device, both valves 34 and 35 are open. The fresh water exits from valve 35 and the concentrated cleaning solution liquid which exits from the valve 34 are mixed in the mixing chamber 103 and then conducted by the way of flexible hose 105 and tube 106 to the floor. If a dilute cleaning solution is desired then the device is placed at the soap position for only a short duration and then the thumb wheel 15 is rotated downwardly slightly to place the device in the dispense position so as to increase the amount of fresh water relative to the total volume of fresh water and concentrated cleaning solution. After this the thumb wheel 15 can be rotated to set the indicator at the scrub position. This will result in closure of the dispensing valves 34 and 35. After the brushes 24 have scrubbed the floor the device is set in its dry position to lower nozzles 26 to pick up waste water off the floor.

In starting up the device, the proper procedure is to first empty any waste water which may be present in the container 13 and then fill the bag 47 with fresh water. Also the container 14 will have been filled with concentrated soap solution or detergent. Prior to mounting the containers 13 and 14 on the handle the indicator 186 should be set in the scrub position. This is so that the fingers 31 and 32 will not be placed in a position to open the valves 34 and 35 as the containers are being placed on the handle. Assuming the containers 13 and 14 have been placed on the handle and the indicator 186 is set at the scrub position, the user is then in readiness to start cleaning the floor. At this stage, the button 38 can be moved to the on position to cause the brushes 24 to rotate. At this time, the suction nozzles 26 will be raised off the floor and the vent 53 will be open. The user then rotates the wheel 15 upwardly to the soap position. This will open valves 34 and 35. By varying the amount of time that valve 35 is open with respect to valve 34, the concentration of the soap solution can be controlled. After the required amount of fresh water and soap has been deposited on the floor the indicator is moved to the scrub position to close valves 34 and 35. The brushes 24 then scrub the floor with soap solution. Thereafter, the indicator 186 is moved to the dry position. This lowers nozzles 26 to pick the waste water off the floor. Then the indicator 186 can be moved to the dispense position which deposits fresh water on the floor for rinsing purpose. Thereafter, moving indicator 186 to the scrub position will spread the fresh water on the floor. After this indicator 186 can be moved to the dry position to lower nozzles 26 and pick the rinse water off the floor. After the bag 47 is emptied of its fresh water, the indicator 186 can be lowered to the scrub position to make sure that the valve 34 is closed. Thereafter, the switch button 38 can be moved to the off position to turn off the device. After this the container 13 can be removed and its waste water emptied and its bag 47 replenished with fresh water.

It was previously pointed out that the instant floor conditioner can also be used to shampoo rugs. The rug shampoo solution can be placed in bag 47 rather than container 14. This means that when the device is set at its dispense position the valve 35 will release rug shampooing liquid. The container 14 can be removed or left in place provided the device is not set at a soap position should container 14 have any liquid therein. The hose 105 is inserted in aperture 165 to connect it with the tube 166 leading to the foam generator. The generated foam is deposited on the rug and after sufficient foam has been generated the valve 35 can be closed by lowering indicator 186 to the scrub position. In this condition of the device the brushes will work the foam into the rug to shampoo it.

It has been previously noted in connection with the description of dial 188 that the scrub position is also a polish position. By this is meant that the brushes can be used to spread solid or liquid wax and then polish the floors. If it is desired to also buff the floors, buffing pads can be connected to the device under brushes in a manner which will be obvious to those skilled in the art. The device can also be used to dispense liquid wax. This is accomplished by placing liquid wax in either bag 47 or tank 14 and then operating the appropriate valve to dispense the wax onto the floor. Preferably, the liquid wax is placed in bag 47 so that the dispense setting dispenses wax. The brushes of course spread the liquid wax on the floor, and then can be used to polish the floors and also buff the floors by the addition of buffing pads to the underside of the brushes.

For purposes of transporting the floor conditioner a roller 193 is provided at the rear of the device. Roller 193 is supported off the rear of frame 16. A latch is provided for latching the handle in a vertical position. When handle is latched in its vertical position, the device can be tilted back onto the roller 193 for purposes of moving it about. The latch for the handle is best shown in FIGS. 3 and 4. It comprises a spring biased and pivoted or rockable latch element 194. It is held captive between the frame 16 and cover 19. It is biased upwardly by a spring 195 and pivoted on a lug 196. A foot engagable extension 197 extends through an opening 198 in the cover 19. The lowermost end of handle 12 is provided with a notch 199. When the handle 12 is moved forwardly to its vertical position the inner end of latch element 194 will be biased upwardly by the spring 195 into the notch 199. This will latch the handle in its vertically up position. In order to release the latch the part 197, which is a foot button portion, is stepped on so as to depress spring 195 and lower the inner end of latch 194 out of the notch 199. When this is done, the handle can be swung to its normal position illustrated in FIG. 1 which is inclined in an upward and rearward direction.

Turning now to FIGS. 21 to 27, illustrated therein is another form of the invention. As in the first form of the invention the device comprises a pair of brushes 300 for supporting a frame 301 on which is mounted a motor 302. The not shown details of the motor 302 as well as the fan and the gearing for driving the brushes 300 are similar to that previously described. The suction nozzles 303 are also similar except that they are bowed slightly. The handle legs 304 and 305 are pivotally connected to the frame 301 as before and are provided with a cross member 306 which provides a mixing chamber or manifold 307 (see FIG. 24) for mixing the soap solution and fresh water and for supporting the weight of a soap container 308 and a fresh and waste water tank 309. The soap container 308 comprises a clear plastic tube which is rotated to dispense its contents in a manner to be described. The fresh and waste water tank 309 is generally U-shaped in transverse cross section. That is to say, its back is provided with a lengthwise extending channel, groove or depression 310. Tank 309 is also divided interiorly thereof into generally equal halves by a wall 311. The part of tank 310 ahead of wall 311 comprises a waste water chamber or compartment 312 and the other part comprises a fresh water chamber or compartment 313.

The bottom of fresh water chamber 313 is provided with a valve 314 for dispensing fresh water. This fresh water valve is controlled by a valve actuator 315 which is operated by a control wire 315' in the handle leg 304 which is connected to an upper hand grip control as in the previous form of the invention. The valve actuator 315 is biased down by a spring 315'' in handle leg 304. A soap dispensing valve 316 is located at the bottom end of soap tube 308. The valve 316 is opened or closed by manually turning tube 308 by manually rotating a wing or finger 317 connected to the upper end of tube 308.

The upper end of the waste chamber 312 is provided with a separator. More particularly, it is provided with a sloped surface 319. The wet air stream enters the separator through an L-shaped fitting 320. After the wet air stream impinges on the surface 319 its moisture falls into chamber 312. The dry air goes to the fan through a large flexible hose 321. The hose 321 is located in the depression 310 in the back of tank 309. The upper end of the hose 321 is connected to a generally L-shaped fitting 322 which is connected to the upper open end of the chamber 312. The L-shaped fitting 320 is disposed inside the fitting 322 and extends therethrough toward the separator surface 319. The dry air is conducted by the hose 321 to the rear of frame 301 where it is connected to a passageway 324 formed in the frame 301, see FIG. 22. The passageway 324 is connected to the fan chamber 325 through an opening 326 formed in the bottom of the fan chamber 325.

The L-shaped fitting 320 has a wet hose 327 connected thereto. Hose 327 is disposed inside hose 321. It is smaller than hose 321 and spaced therefrom. The lower end of hose 327 is connected to a Y-shaped fitting 328, see FIG. 23. Y-shaped fitting 328 is located in the dry air stream path at the place where large hose 321 is connected to dry passageway 324. The rear suction nozzle is connected to one leg of the Y-shaped fitting 328 by a flexible sleeve 329. The other nozzle is connected to the other leg of the Y-shaped fitting 328 by a flexible hose 330.

The top of the fresh water container is closed, as indicated by its top surface 331, see FIG. 27. At its upper end and its right side when viewing FIG. 24 it is provided with a valve element 332 disposed in a valve opening 333. Valve element 332 is generally mushroom shaped. The underside of its head is provided with slots 334 communicating with the opening 333 to vent the chamber 313 to the atmosphere. This permits gravity flow of fresh water through the water valve 314 when valve 314 is raised. Valve actuator 315 is normally biased down to valve closed position by spring 315''. However, when the not shown hand grip control is actuated to pull up on the wire 315' valve 314 is raised off a valve seat 335 to dispense fresh water into manifold 307 of cross member 306. The water is conducted from the manifold 307 to the floor adjacent brushes 300 by a conduit 336. Valve seat 335 comprises a closure plug for an opening 337 in the bottom 371 of fresh water chamber 313. It is threaded into the opening 337. In order to refill chamber 313 with fresh water the tank 309 is removed and inverted. When it is inverted the valve 332 drops slightly so that its lower enlarged end closes opening 333. The plug 335 is unscrewed and thereafter the chamber 313 can be refilled by directing a stream of water into opening 337. If one desires to empty the contents of chamber 313, but not on the floor, tank 309 is removed and carried to a sink where it is inverted and emptied by depressing the valve 332. Hand carrying tank 309 is facilitated by providing a recessed handle portion 338, see FIG. 25, in front of the separator wall 319.

The soap tube 308 is positioned along the rear left hand corner of tank 309, see FIG. 24. This rear left hand corner is provided with a lengthwise extending recess 339, see FIG. 26, for tube 308. The weight of both the soap tube 308 and tank 309 are supported by the cross member 306. Cross member 306 is provided with a peripherally extending upper edge 340, see FIGS. 25 and 26, for nesting the lower ends of the tube 308 and tank 309. Just beneath the lower end of soap tube 308 an integral arcuate cam surface 341 is formed on cross member 306. This cam surface 341 cooperates with a cam follower by 342 on the bottom of tube 308 to open and close the valve 316. Cam follower 342 is an integral portion of a valve seat member 343. Just below the lower tip of the valve 316 and centrally of the arcuate cam surface 341 is an integral projection 344 on the cross member 306. The cam surface 341 is sloped from one end to its other end. When the tube 308 is rotated the cam follower 342 rides on surface 341 to raise or lower the tube 308. When tube 308 is lowered the projection 344 engages the valve 316 to raise or open it. If the tube is turned in an opposite direction the tube is raised to disengage parts 316 and 344 to close the soap valve.

The upper end of tube 308 is nested in a downwardly facing recess provided at the rear left hand corner of fitting 322, see FIGS. 24 and 27. This recess is defined by an integral arcuate wall 345 on fitting 322. The wing 317 at the upper end of the 308 is an integral part of a a removable closure plug 346. Plug 346 is removable for purposes of refilling or emptying tube 308. The wing 317 is provided with a slot 347. Slot receives the wall 345 for purposes of rotatably guiding the wing 317 along wall 345 to rotate tube 308. The tube is inserted or removed by aligning the wing 317 with a slot 348 in wall 347. When the plug 346 is placed in the tube 308 the wing 317 fits into a slot 349 in the upper end of tube 309. This ensures proper alignment of the wing 317 and cam follower 342.

The opposite forward corners of the fitting 322 are provided with integral arcuate portions 350, see FIG. 26. These arcuate portions 350 fit between and nest the handle legs 304 and 305. Arcuate portions 350 are provided with integral lugs 351, see FIG. 27, which enter not shown apertures in the handle legs to lock the fitting 322 to the handle legs. The cross member 306 has similar integral arcuate portions 352, see FIG. 24, for the handle legs and lugs and handle apertures for the lugs to lock the cross member 306 to the handle legs. The fitting 322 and cross member 306 can be disassembled from the handle legs by spreading the handle legs apart. However after assembly, they are intended to be fixed on the handle legs and support the soap container 308 and tank 309 in position. The tank 309 is removed by pushing it forward from its position between the handle legs. To mount the tank 309 it is positioned on the cross member 306 and then pushed rearwardly between the handle legs. As it is pushed rearwardly the upper surface 331 of tank 309, see FIG. 27, which is curved, friction rides on a downwardly facing curved edge 353 formed on opposite sides of fitting 322. The friction fit between curved surface 331 and curved edges 353 retains tank 309 in mounted position. The botom of tank 309 of course is nested within the edge 340 of the cross member, and cooperative latching edges 354, see FIG. 25, are provided at the upper end of tank 309 and fitting 322 to latch the upper end of tank 309 in position. The opening 355, see FIG. 26, at the upper end of the tank 309 is provided solely in the waste water chamber 312. The forward open end 356, see FIG. 25, in fitting 322 fits into opening 355, see FIGS. 25 and 26. The hose 321 is connected to the lower open end 357, see FIG. 25, of fitting 322 by a flexible sleeve 358. The lower open end 357, which is tubular, has an integral extension 357' which extends up into the forward open end 356. The front surface of extension 357' is provided with a slot 357'', see FIG. 26, to pass the other fitting 320 through the fitting 322. The hose 37 is inserted into the lower end of fitting 320 and the upper end of fitting 320 faces the separator chamber or area wall 319 for discharge of the wet air stream against wall 319. Fitting 320 is provided with an integral curved flange 320' to close the slot 357'' and help retain fitting 320 in place.

The suction nozzles 303 are biased down by coil springs 360 located between the nozzles 303 and frame 301, see FIG. 21. Nozzles 303 are vertically guided up and down by guide bars 361 connected to the opposite ends of the nozzles. The guide bars 361 ride in vertical guide channels 362 connected to the corners of frame 301. Pull wires 363 are connected to the nozzles for raising them. The wires extend from the nozzles through frame 301 to a foot operated lever 364, see FIG. 22. Lever 364 is shown in the nozzles latched up position in FIGS. 21 and 22. Lever 364 is pivoted to the frame 301 by a stud 364. Superposed on the lever 364 is a leaf spring 366. Leaf spring biases the lever 364 for movement over a latch lug 367 after it is pivoted above the lug 367. In other words, merely depressing the rear end of lever 364 with foot pressure will raise the nozzles, and result in them being latched in the up position. In order to lower the nozzles the ream end of lever 364 is moved by foot pressure towards the center of the device to dislodge the lever 364 off the latch lug 367 after which the coil springs 360 will lower the nozzles.

In the operation of the device the soap container 308 and tank 309 are first removed and filled with concentrated soap solution and fresh water. Since soap container 308 and tank 309 are individually mounted between fitting 322 and cross member 306 each can be removed and mounted independently of the other. If the waste chamber 312 is filled its contents are emptied through the opening 355.

The motor 302 is controlled by an on-off hand grip switch similar to that previously described. The motor 302 can be turned on before or after dispensing soap and water on the floor. Before soap or water are dispensed on the floor the operator should step on the foot lever 364 to make sure that the nozzles are raised off the floor. To dispense water on the floor the hand grip control for pull wire 315' is operated to raise valve actuator 315. The actuator 315 extends through a slot in handle leg 304 and an aligned slot 368, see FIG. 24, in the side wall of manifold 307 to beneath the valve 314. Valve 314 is normaly biased to closed position by a spring or the like. Lifting of valve actuator 315 results in opening of valve 314 to dispense fresh water. The water is conducted from manifold 307 to the floor adjacent the brushes by tube 36. Soap solution is dispensed onto the floor by rotating wing 317 to open valve 316. Valve 316 can be constructed from rubber and its integral portions normally bias it to closed position. When valve 316 is raised off the opening in valve seat 343 soap flows out through slots 369 in valve 316 and the opening in the valve seat 343. Soap can be dispensed before, with or after dispensing of fresh water. If it is dispensed simultaneously with the fresh water then the soap and water are mixed in manifold 307. In any event, the strength of the cleaning solution on the floor can be controlled by varying the amount of either soap or water dispensed relative to the other. If the motor has been or now is turned on the brushes 300 will spread the cleaning solution on the floor and scrub the floor. After the floor is sufficiently scrubbed the nozzles are lowered by appropriate movement of the foot lever 364. As the device is moved back and forth along the floor the nozzles will pick up the waste water. The wet air stream will travel along the following path: hoses 329 and 330, fitting 328, hose 327, fitting 320, and then against the surface 319 in the separator area or chamber in the upper end of waste liquid chamber 312. After impinging against surface 319 the moisture in the wet air stream will collect as droplets on the surface 319 and then fall by gravity into the bottom of chamber 312. The air, now in a dry or moisture relieved condition, will follow the following path: opening 356, tubular part 357' of fitting 322, sleeve 358, hose 321, passageway 324, fan opening 326, fan chamber 325, and then out of fan chamber 325 through its tangential exhausts 370. After the waste cleaning solution has been picked up, the nozzles are raised and the valve 314 alone is opened to dispense just fresh water on the floor to rinse it. The brushes spread the rinse water, and then the nozzles are lowered to pick up the waste rinse water.

In one form of the just described second form of the invention the tank 309 actually comprised two tanks cemented together as indicated by the double layer in the wall 311. In other words, chamber 312 comprised one tank, and chamber 313 comprised the other tank. The two tanks can be provided with separate bottoms, or a single piece bottom for both tanks as indicated by reference numeral 371 in FIG. 25. Additionally, the second form of the invention is also useful in waxing and polishing floors and in shampooing rugs. The brushes 300, unless they are multipurpose brushes, are replaced by floor waxing and polishing or rug shampooing brushes. Solid or liquid wax can be spread by the brushes. The brushes can then polish the wax, and buffing pads positioned beneath the brushes to give the wax a high luster. The liquid wax or rug shampooing liquid can be dispensed from either tube 308 or chamber 313. However, dispensing wax or rug shampooing liquid from tube 308 may be preferable since it may be more convenient to rinse than chamber 313 which can then be reserved solely for fresh rinse water. The tube 308 has the further advantage of being constructed from clear plastic so that the level of its contents can be readily observed.

While there have been shown and described particular embodiments of the invention, it will be obvious to those skilled in the art that changes and modifications may be made without departing from the invention, and that it is intended by the appended claim to cover all such changes and modifications as fall within the true spirit and scope of the invention.

What is claimed as new and desired to be secured by Letters Patent of the United States is:

1. A floor conditioner, comprising, a frame, a rotary scrubbing brush mounted beneath said frame, a motor and suction fan mounted on said frame, means connecting said brush and fan in drive relationship with said motor, a handle on said frame, two containers mounted on said handle, a concentrated liquid cleaning solution in one of said containers, a partition in the other container dividing the same into two compartments, said partition being flexible whereby the volumes of said compartments are variable with respect to each other, fresh water in one of said compartments, valve means for dispensing either said fresh water alone or with said cleaning solution to dilute the latter, the other compartment comprising a waste liquid receptacle, a suction nozzle mounted on said frame, means in said other compartment for separating moisture from a wet air stream, conduit means connecting said nozzle, said other compartment, and said fan in a series air stream circuit, control means for said valve means, control means for engaging and disengaging said nozzle with a floor, control means for opening and closing said air stream circuit, each of said control means being mounted on said handle, and a single manually operable operating member on said handle for operating all of said control means.

2. In a floor conditioner as in claim 1, wherein said handle comprises a pair of tubular handle legs arranged with respect to each other in the form of a narrow inverted V-shape, a control rod in one of said legs, said control rod being interconnected with said operating member and each of said three-mentioned control means, a hand grip portion at the upper end of said handle, said operating member being located at said hand grip portion, an on-off switch at said hand grip portion, and an electrical conductor in the other of said handle legs, said electrical conductor being connected to said switch and motor.

3. In a floor conditioner as in claim 2, said handle being pivotally connected to said frame and means for latching said handle in an upright position, an actuator on said rod for said valve means, said air stream circuit control means comprising an atmospheric vent opening on said other container for said waste liquid receptacle, a movable cover for said vent opening, and an actuator on said rod for said cover; said containers being removably mounted on said handle and said actuators making loose contact with said valve means and cover for quick separation of said containers from the actuators of their respective valve means and cover.

4. A floor conditioner, comprising, a frame, a rotary scrubbing brush mounted beneath said frame, a motor and suction fan mounted on said frame, means connecting said brush and fan in drive relationship with said motor, a handle on said frame, two containers mounted on said handle, a concentrated liquid cleaning solution in one of said containers, a partition in the other container dividing the same into two compartments, said partition being flexible whereby the volumes of said compartment are variable with respect to each other, fresh water in one of said compartments, valve means for dispensing either said fresh water alone or with said cleaning solution to dilute the latter, the other compartment comprising a waste liquid receptacle, a suction nozzle mounted on said frame, means in said other compartment for separating moisture from a wet air stream, conduit means connecting said nozzle, said other compartment, and said fan in a series air stream circuit, a suction nozzle provided at the front and rear portion of said frame, said suction nodzles being guided for vertical up and down movement on said frame, and means for controlling said movement, comprising, a movable control rod in said handle, a pair of pulleys on said frame, a pair of pull wires extending from said control rod over said pulleys to said suction nozzles, and each of said suction nozzles being elongated in a direction crosswise of said frame and having a flexible squeegee blade positioned therein for engaging a floor surface when said nozzles are lowered, and means of said frame for directing the exhaust air of said suction fan to said floor surface.

5. A floor conditioner, comprising, a frame, a rotary brush mounted beneath said frame, a motor and suction fan mounted on said frame, means connecting said brush and fan in drive relationship with said motor, an elongated handle on said frame, a tank mounted on said handle, said tank being elongated in a direction lengthwise of said handle, an inverted bag in said tank, said bag having its open bottom connected to the tank bottom, said bag being flexible whereby it can be collapsed to zero volume or expanded to occupy substantially the total space inside said tank, cleaning liquid in said bag, a filler opening and valve means in the tank bottom for filling said bag and dispensing said liquid, means in the upper end of said tank for separating moisture from a wet air stream and depositing the same in said tank about said bag, a suction nozzle mounted on said frame, conduit means connecting said nozzle and the inlet of said fan to the upper end of said tank adjacent opposite sides of said separating means, an opening in the upper end of said tank for venting the same to the atmosphere and emptying its contents, a closure element for said last mentioned opening, control means provided on said handle for said valve means, said closure element, and for raising and lowering said nozzle, said handle having a hand grip portion, and a single manually operable actuator at said hand grip portion for operating said control means.

References Cited
UNITED STATES PATENTS 3,258,803  7/1966  Wolter et al. _____ 15—320 X ROBERT W. MICHELL, Primary Examiner